United States Patent
Wan et al.

(10) Patent No.: US 12,192,479 B2
(45) Date of Patent: *Jan. 7, 2025

(54) PICTURE ENCODING METHOD, PICTURE DECODING METHOD, ENCODER, DECODER AND STORAGE MEDIUM

(71) Applicant: GUANGDONG OPPO MOBILE TELECOMMUNICATIONS CORP., LTD., Guangdong (CN)

(72) Inventors: Shuai Wan, Guangdong (CN); Junyan Huo, Guangdong (CN); Yanzhuo Ma, Guangdong (CN); Fuzheng Yang, Guangdong (CN); Jinkun Guo, Guangdong (CN); Haixin Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 179 days.

This patent is subject to a terminal disclaimer.

(21) Appl. No.: 17/382,932

(22) Filed: Jul. 22, 2021

(65) Prior Publication Data

US 2021/0352298 A1    Nov. 11, 2021

Related U.S. Application Data

(63) Continuation of application No. 17/211,636, filed on Mar. 24, 2021, now Pat. No. 11,146,798, which is a
(Continued)

(51) Int. Cl.
*H04N 19/159*    (2014.01)
*G06F 5/01*    (2006.01)
(Continued)

(52) U.S. Cl.
CPC ............. *H04N 19/159* (2014.11); *G06F 5/01* (2013.01); *H04N 19/172* (2014.11); *H04N 19/184* (2014.11)

(58) Field of Classification Search
CPC .. H04N 19/159; H04N 19/172; H04N 19/184; H04N 19/176; H04N 19/11; H04N 19/117; H04N 19/593; G06F 5/01
See application file for complete search history.

(56) References Cited

U.S. PATENT DOCUMENTS 10,104,374 B2    10/2018    He et al.
11,146,798 B2 *  10/2021    Wan ................. H04N 19/184
(Continued)

FOREIGN PATENT DOCUMENTS

CN    1973547 A    5/2007
CN    101771867 A    7/2010
(Continued)

OTHER PUBLICATIONS

First Office Action of the Canadian application No. 3112849, issued on Apr. 11, 2022. 5 pages.
(Continued)

*Primary Examiner* — Tat C Chio
(74) *Attorney, Agent, or Firm* — Perkins Coie LLP

(57) ABSTRACT

Picture coding and decoding methods, an encoder, a decoder and a storage medium are provided. The encoder, before performing coding processing according to a matrix-based intra prediction (MIP) mode, sets initial right shift parameters corresponding to different sizes and different MIP mode numbers as an uniform offset parameter, the offset parameter indicating a number of right shifting bits of a predicted value, and when performing coding processing according to the MIP mode, performs coding processing according to the offset parameter. The decoder, before per-
(Continued)

forming decoding processing according to an MIP mode, sets initial right shift parameters corresponding to different sizes and different MIP mode numbers as an uniform offset parameter, the offset parameter indicating a number of right shifting bits of a predicted value, and when performing decoding processing according to the MIP mode, performs decoding processing according to the offset parameter.

14 Claims, 6 Drawing Sheets

Related U.S. Application Data continuation of application No. PCT/CN2019/092689, filed on Jun. 25, 2019.

(51) Int. Cl.
  H04N 19/172 (2014.01)
  H04N 19/184 (2014.01)

(56) References Cited

U.S. PATENT DOCUMENTS

| | | | |
|---|---|---|---|
| 2012/0163473 | A1 | 6/2012 | Laroche et al. |
| 2013/0259120 | A1 | 10/2013 | Van et al. |
| 2016/0373770 | A1 | 12/2016 | Zhao et al. |
| 2018/0020223 | A1 | 1/2018 | King |
| 2019/0037213 | A1 | 1/2019 | Hermansson et al. |
| 2020/0389661 | A1 | 12/2020 | Zhao et al. |
| 2020/0396455 | A1 | 12/2020 | Liu et al. |
| 2020/0396459 | A1 | 12/2020 | Lin et al. |
| 2022/0103813 | A1* | 3/2022 | Pfaff ............... H04N 19/147 |
| 2022/0141453 | A1 | 5/2022 | Huo |
| 2022/0182603 | A1* | 6/2022 | Lee ............... H04N 19/119 |

FOREIGN PATENT DOCUMENTS

| | | |
|---|---|---|
| CN | 104702959 A | 6/2015 |
| CN | 105874793 A | 8/2016 |
| CN | 107071417 A | 8/2017 |
| CN | 107743705 A | 2/2018 |
| CN | 108781283 A | 11/2018 |
| CN | 109792520 A | 5/2019 |
| GB | 201118705 | 12/2011 |
| JP | 2000092331 A1 | 3/2000 |
| KR | 20110065116 A | 6/2011 |
| RU | 2658812 C2 | 6/2018 |
| WO | 2016205712 A1 | 12/2016 |
| WO | 2017123133 A1 | 7/2017 |
| WO | 2020207491 A1 | 10/2020 |
| WO | 2020210489 A1 | 10/2020 |
| WO | 2020246806 A1 | 12/2020 |
| WO | 2020255769 A1 | 12/2020 |

OTHER PUBLICATIONS

First Office Action of the European application No. 19935158.6, issued on Jan. 31, 2022. 4 pages.
First Office Action of the Indian application No. 202127015692, issued on Feb. 4, 2022. 7 pages with English translation.
Notice of Allowance of the Chinese application No. 202110310256.2, issued on Apr. 20, 2022. 7 pages with English translation.
USPTO, Corrected Notice of Allowability for U.S. Appl. No. 17/211,636. Mail Date: Sep. 8, 2021. 6 pages.
Written Opinion of the International Search Authority in the international application No. PCT/CN2019/092689, mailed on Mar. 25, 2020. 6 pages with English translation.
Biatek et al. "Non-CE3: MIP low resolution clipping", JVET-O0168-v2, 15th Meeting: Gothenburg, SE, Jul. 3-12, 2019. 7 pages.
Second Office Action of the European application No. 19935158.6, issued on May 13, 2022. 5 pages.
First Office Action of the Russian application No. 2021111540, issued on Sep. 19, 2022. 11 pages with English translation.
Junyan Huo et al., "Non-CE3: Unification of shifting for MIP mode", JVET-O0323 v1, Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
First Office Action of the Japanese application No. 2021-568185, issued on Jun. 16, 2023. 12 pages with English translation.
First Office Action of the Israeli application No. 281400, issued on Jun. 27, 2023. 4 pages.
Supplementary European Search Report in the European application No. 23170496.6, mailed on Jul. 14, 2023. 9 pages.
First Office Action of the Indonesian application No. P00202102696, issued on Sep. 13, 2023. 3 pages with English translation.
Second Office Action of the Japanese application No. 2021-568185, issued on Nov. 10, 2023. 6 pages with English translation.
International Search Report in the international application No. PCT/CN2019/092689, mailed on Mar. 25, 2020.
PFAFF, Jonathan et al. "CE3: Affine linear weighted intra prediction (CE3-4.1, CE3-4.2)" Joint Video Experts Team (JVET) of ITU-T SG 16 WP 3 and ISO/IEC JTC 1/SC 29/WG 11 14th Meeting: Geneva, CH, Mar. 19, 2019 (Mar. 19, 2019), sections 1-2.
Bross, Benjamin. "Versatile Video Coding (Draft 5)" Joint Video Experts Team(JVET) of ITU-T SG 16 WP 3 and ISO/IEC JTC 1/SC 29/WG 11 14th Meeting: Geneva, CH, Mar. 19, 2019 (Mar. 19, 2019), section 8.4.5.2.1.
Chen, JianLe. "Algorithm description for Versatile Video Coding and Test Model 5 (VTM 5)" Joint Video Experts Team (JVET) of ITU-T SG 16 WP 3 and ISO/IEC JTC 1/SC 29/WG 11 14th Meeting: Geneva, CH, Mar. 19, 2019 (Mar. 19, 2019), entire document.
PFAFF (Fraunhofer) J et al: "8-bitmplementation and simplification of MIP", 15. JVET Meeting: Jul. 3, 2019-Jul. 12, 2019: Othenburg; (The Joint Video Explorationteam of ISO/IEC JTC1/SC29/WG11 and ITU-TSG.16), No. JVET-O0084, Jun. 18, 2019 (Jun. 18, 2019), XP030205620, abstract, section "1.1 Algorithmic description".
PFAFF (Fraunhofer) J et al.: "CE3: Affinelinear weighted intra prediction (test 1.2.1, test 1.2.2)", 13. JVET Meeting; Jan. 9, 2019-Jan. 18, 2019: Marrakech; (The Joint Video Exploration Team of ISO/IEC JTC1/SC29/WG11 and ITU-T SG.16 ), No. JVET-M00432, Jan. 2019 (Jan. 2, 2019), XP030200159, abstract, section "1.1 Description of the method", section "2.1 Description of the method".
Supplementary European Search Report in the European application No. 19935158.6, mailed on May 19, 2021.
Notice of Allowance of the U.S. Appl. No. 17/211,636, issued on May 21, 2021.
First Office Action of the Israeli application No. 309549, issued on Jun. 5, 2024. 4 pages with English translation.
Jianbin Zhou et al., "Angular Intra Prediction Based Measurement Coding Algorithm for Compressively Sensed Image", 2018 IEEE International Conference on Multimedia & Expo Workshops (ICMEW), Jul. 23-27, 2018, DOI: 10.1109/ ICMEW.2018.8551508, the whole document. 8 pages.
Myounghoon Kim et al., "Efficient Transform Domain Transcoding: Intra Frame of H.264/AVC to JPEG", IEEE Transactions on Consumer Electronics, vol. 57, No. 3, Aug. 2011, the whole document. 8 pages.
Ziyuan Geng, "Improved Fast Mode Decision Algorithms Based on HEVC Screen Content Coding", Beijing University of Posts and Telecommunications, Dec. 1, 2017, the whole document. 106 pages with English translation.
First Office Action of the Chinese application No. 202210766458.2, issued on Aug. 15, 2024. 12 pages with English translation.
First Written Opinion of the Singaporean application No. 11202102562W, issued on Mar. 6, 2024. 9 pages.
First Office Action of the Mexican application No. MX/a/2021/004541, issued on Apr. 17, 2024. 8 pages with English translation.
First Office Action of the Malaysian application No. PI2021001408, issued on Oct. 18, 2024. 5 pages.
Second Office Action of the Israeli application No. 309549, issued on Nov. 7, 2024. 3 pages.

(56) References Cited

OTHER PUBLICATIONS

First Office Action of the Australian application No. 2019455073, issued on Nov. 13, 2024. 3 pages.
First Office Action of the Japanese application No. 2024-030632, issued on Nov. 15, 2024. 6 pages with English translation.

\* cited by examiner

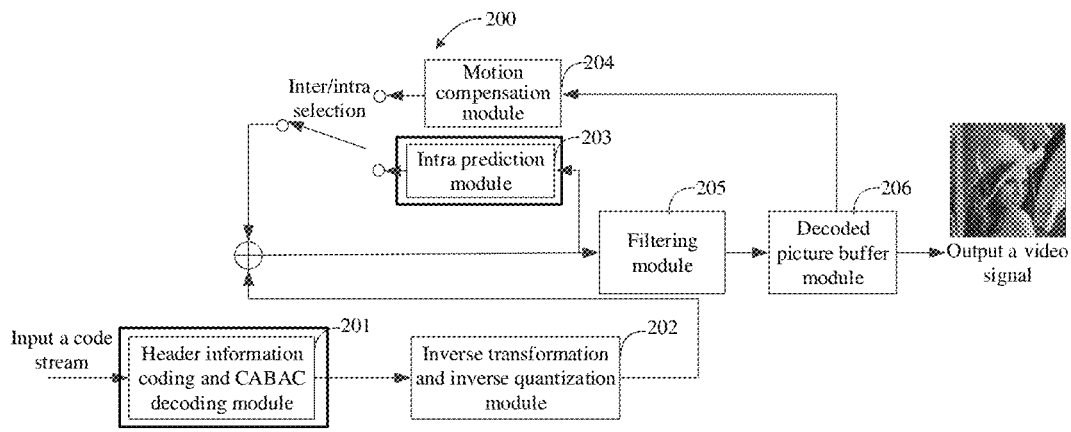

FIG. 6

| Before coding processing is performed according to an MIP mode, performing unification modification on initial right shift parameters corresponding to different sizes and different MIP mode numbers according to an offset parameter, the offset parameter indicating the number of right shifting bits of a predicted value | 101 |
|---|---|

↓

| When coding processing is performed according to the MIP mode, performing coding processing according to the offset parameter | 102 |
|---|---|

FIG. 7

| Before coding processing is performed according to an MIP mode, performing unification modification on initial right shift parameters corresponding to different sizes and different MIP mode numbers according to an offset parameter, the offset parameter indicating the number of right shifting bits of a predicted value | 101 |
|---|---|

↓

| Modifying an initial weight matrix and an initial bias matrix according to a preset calculation rule to obtain a modified weight matrix and a modified bias matrix, the initial weight matrix and the initial bias matrix corresponding to the initial right shift parameter subjected to unification modification | 103 |
|---|---|

↓

| Performing coding processing according to the offset parameter, the modified weight matrix and the modified bias matrix | 104 |
|---|---|

FIG. 8

PICTURE ENCODING METHOD, PICTURE DECODING METHOD, ENCODER, DECODER AND STORAGE MEDIUM

CROSS-REFERENCE TO RELATED APPLICATION

This is a continuation application of U.S. patent application Ser. No. 17/211,636, filed Mar. 24, 2021, which is a continuation of International Application No. PCT/CN2019/092689 filed on Jun. 25, 2019, the contents of which are hereby incorporated by reference in their entirety.

TECHNICAL FIELD

Embodiments of the application relate to the technical field of video coding and decoding, and particularly to picture coding and decoding methods, an encoder, a decoder and a storage medium.

BACKGROUND

In a reference software test platform for Versatile Video Coding (VVC), a novel intra coding technology, Matrix-based Intra Prediction (MIP), is proposed. MIP is a neural-network-based intra prediction technology, namely a luma value of a present block is predicted by use of a multilayer neural network based on an adjacent reconstructed luma block. Specifically, like a conventional intra mode, when an MIP mode is adopted for intra prediction, an input for MIP is also data of adjacent luma blocks, in a row at the top and a column on the left, of the present block, while an output is a predicted value of a luma component of the present block. A specific prediction process is divided into three stages: down-sampling, matrix vector multiplication and interpolation.

However, when an MIP mode is adopted for luma prediction, parameters for luma blocks with different sizes may also be different. Therefore, a relatively large storage space is required to be occupied to store a large number of parameters, and searching and calling parameters in a prediction process also prolongs total time and further reduces the coding and decoding efficiency.

SUMMARY

The embodiments of the disclosure provide picture coding and decoding methods, an encoder, a decoder and a storage medium, which may reduce a storage space and total time required in a coding and decoding process, and effectively improving the coding and decoding efficiency, on the basis of ensuring the coding and decoding performance.

The technical solutions of the embodiments of the disclosure are implemented as follows.

The embodiments of the disclosure provide a picture coding method, which may be applied to an encoder and include the following operations.

Before coding processing is performed according to an MIP mode, initial right shift parameters corresponding to different sizes and different MIP mode numbers are set as an uniform offset parameter. The offset parameter indicates the number of right shifting bits of a predicted value.

When coding processing is performed according to the MIP mode, coding processing is performed according to the offset parameter.

The embodiments of the disclosure provide a picture decoding method, which may be applied to a decoder and include the following operations.

Before decoding processing is performed according to an MIP mode, initial right shift parameters corresponding to different sizes and different MIP mode numbers are set as an uniform offset parameter. The offset parameter indicates the number of right shifting bits of a predicted value.

When decoding processing is performed according to the MIP mode, decoding processing is performed according to the offset parameter.

The embodiments of the disclosure provide an encoder, which may include a first modification section and a coding section.

The first modification section may be configured to set, before coding processing is performed according to an MIP mode, initial right shift parameters corresponding to different sizes and different MIP mode numbers as an uniform offset parameter, the offset parameter indicating the number of right shifting bits of a predicted value.

The coding section may be configured to perform, when coding processing is performed according to the MIP mode, coding processing according to the offset parameter.

The embodiments of the disclosure provide a decoder, which may include a second modification section and a decoding section.

The second modification section may be configured to set, before decoding processing is performed according to an MIP mode, initial right shift parameters corresponding to different sizes and different MIP mode numbers as an uniform offset parameter, the offset parameter indicating the number of right shifting bits of a predicted value.

The decoding section may be configured to perform, when decoding processing is performed according to the MIP mode, decoding processing according to the offset parameter.

The embodiments of the disclosure provide an encoder. The encoder may include a first processor, a first memory storing an instruction executable for the first processor, a first communication interface and a first bus configured to connect the first processor, the first memory and the first communication interface. The instruction may be executed by the first processor to implement the picture coding method as mentioned above.

The embodiments of the disclosure provide a decoder. The decoder may include a second processor, a second memory storing an instruction executable for the second processor, a second communication interface and a second bus configured to connect the second processor, the second memory and the second communication interface. The instruction may be executed by the second processor to implement the picture decoding method as mentioned above.

The embodiments of the disclosure provide a computer-readable storage medium having stored thereon a program, applied to an encoder and a decoder. The program may be executed by a processor to implement the picture coding and decoding methods as mentioned above.

The embodiments of the disclosure provide picture coding and decoding methods, an encoder, a decoder and a storage medium. The encoder, before performing coding processing according to an MIP mode, performs unification modification on initial right shift parameters corresponding to different sizes and different MIP mode numbers according to an offset parameter, the offset parameter indicating the number of right shifting bits of a predicted value, and when performing coding processing according to the MIP mode, performs coding processing according to the offset parameter. The decoder, before performing decoding processing according to an MIP mode, performs unification modification on initial right shift parameters corresponding to different sizes and different MIP mode numbers according to an offset parameter, and when performing decoding processing according to the MIP mode, performs decoding processing according to the offset parameter. According to the picture coding and decoding methods in the disclosure, unification modification is performed on the number of the right shifting bits of the predicted value by use of the offset parameter to ensure that all luma blocks with different sizes and different MIP mode numbers have the same sW value. Therefore, it is unnecessary to query and call the sW value during coding and decoding processing, complexity of an MIP algorithm may be reduced, and on the basis of ensuring the coding and decoding performance, a storage space and total time required in a coding and decoding process may be reduced and the coding and decoding efficiency may be effectively improved.

BRIEF DESCRIPTION OF THE DRAWINGS

FIG. 6 is a structure diagram of a video decoding system.

FIG. 7 is a first implementation flowchart of a picture coding method according to an embodiment of the disclosure.

FIG. 8 is a second implementation flowchart of a picture coding method according to an embodiment of the disclosure.

DETAILED DESCRIPTION

Figure 1:
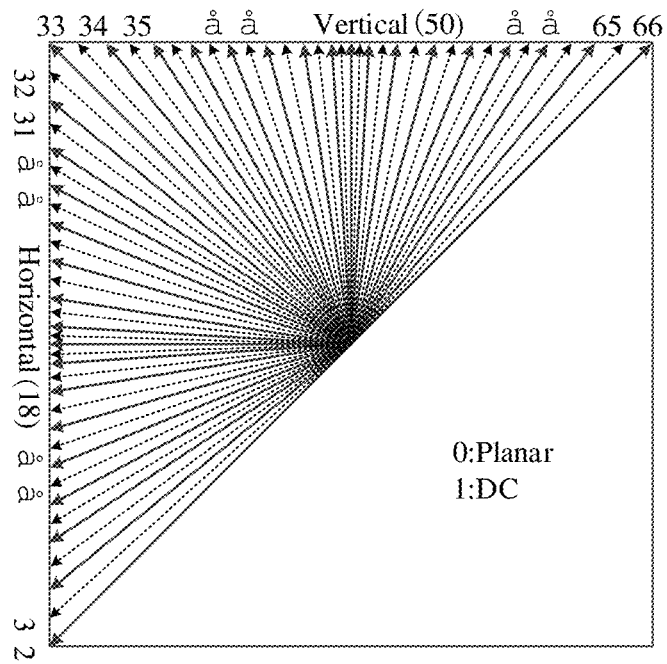
FIG. 1 is a layout diagram of 67 prediction modes for intra prediction.

The technical solutions in the embodiments of the disclosure will be clearly and completely described below in combination with the drawings in the embodiments of the disclosure. It is to be understood that the specific embodiments described here are adopted not to limit the related application but only to explain the disclosure. In addition, it is also to be noted that, for convenient description, only parts related to the disclosure are illustrated in the drawings.

For video pictures, VVC accepts affine linear weighted intra prediction proposed in Joint Video Experts Team (JVET)-N0217, renamed matrix-based intra prediction, i.e., MIP. According to the technology, for different sizes of intra luma coding blocks, different numbers of MIP modes are added in an intra luma prediction process.

For capturing a more detailed edge direction presented in a natural video, 33 angular intra luma prediction modes defined in High Efficiency Video Coding (HEVC) in VVC are extended to 65. FIG. 1 is a layout diagram of 67 prediction modes for intra prediction. As illustrated in FIG. 1, the arrowhead numbers 2 to 66 represent the 65 angular intra prediction modes, and there are two other non-angular modes, i.e., a planar mode numbered to be 0 and a Direct Current (DC) mode numbered to be 1. Therefore, an intra prediction process for VVC includes two non-angular modes and 65 angular modes. Here, the 67 prediction modes are called conventional modes for intra prediction.

MIP is a neural-network-based intra prediction technology, namely a luma value of a present block is predicted by use of a multilayer neural network based on adjacent reconstructed pixels. Specifically, through the MIP technology, luma coding blocks are divided into three types according to a size of the intra luma coding block. It is set that the size of the luma coding block is W×H, where W is a width parameter and H is a height parameter. The luma coding blocks may be divided into three types according to the size of the luma coding block.

A luma coding block with a 4×4 size is a first-type luma block, luma coding blocks with 8×4, 4×8 and 8×8 sizes are second-type luma blocks, and a luma coding block with another size is a third-type luma block.

For the three types of intra luma coding blocks, M MIP modes are added in the MIP technology based on the 67 conventional intra prediction modes. For first-type luma blocks, M=35. For second-type luma blocks, M=19. For third-type luma blocks, M=11.

Specifically, the MIP technology is applied to intra luma prediction only. Like a conventional mode, an input for MIP is also data of a row at the top and column on the left of a present block, while an output is a predicted value of the present block. A specific prediction process is divided into three steps: averaging, matrix vector multiplication and interpolation. That is, the three steps may be executed on input reconstructed luma values of adjacent pixels in the row at the top and the column on the left to obtain a predicted value of a luma component of the present block.

Figure 2:
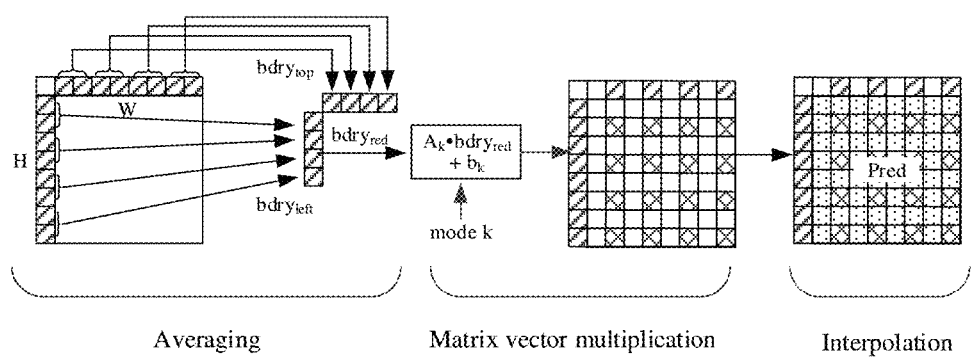
FIG. 2 is a flowchart of coding in an MIP mode.

FIG. 2 is a flowchart of coding in an MIP mode. As illustrated in FIG. 2, luma prediction in the MIP mode is specifically implemented as follows.

In S1, an averaging operation is executed on top-side adjacent reference points of a present block to obtain a vector $bdry_{top}$, totally N values, and an averaging operation is executed on left-side adjacent reference points of the present block to obtain a vector $bdry_{left}$, totally N values. When the present block is a first-type luma coding block, N=2. When the present block is a second-type or third-type luma coding block, N=4. The vector $bdry_{top}$ and the vector $bdry_{left}$ form a new vector $bdry_{red}$, and subsequent operations are executed.

In S2, a corresponding matrix $A_k$ and offset $b_k$ are obtained through a mode number k of the MIP mode, and part of predicted values of the present block identified with crossing lines in FIG. 2 are calculated through the following formula (1):

$$Pred_{red} = A_k \cdot bdry_{red} + b_k \quad (1)$$

In S3, linear interpolation is performed to obtain residual predicted values Predred in the present block.

It is to be noted that, for an implementation process of coding the present block, a specific coding mode for intra prediction is required to be written into a compressed code stream such that a decoder may parse mode information to determine whether the specific mode adopted is a conventional mode or an MIP mode, if it is a conventional mode, determine a specific conventional mode, and if it is an MIP mode, determine a specific MIP mode.

In intra prediction for VVC, for each luma coding block, rate distortion costs RDcost corresponding to the 67 conventional modes and the M MIP modes are compared and an optimal mode is selected from the 67 conventional modes and the M MIP modes for coding. For reducing the bit overhead, a Most Probable Modes (MPM) list-based intra-mode coding technology is adopted for VVC.

It is to be noted that, since extend reference line and Intra Sub-Partitionar (ISP) are applied to modes in an MPM list only, when both extendreflag and ispflag are 0, namely no reference line is adopted and sub-block partitioning is not performed, mpmflag is not required to be coded, and a position of the optimal mode in the MPM list is directly coded.

For construction of an MPM list and an MIPMPM list, during intra luma prediction for VVC, if an optimal mode selected for the present block is a conventional mode, it is necessary to construct an MPM list including 6 most probable conventional modes; and if the optimal mode selected for the present block is an MIP mode, it is necessary to construct an MIPMPM list including 3 most probable MIP modes.

Figure 3:
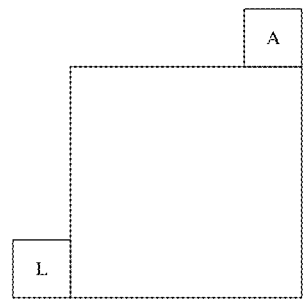
FIG. 3 is a layout diagram of a top-side adjacent luma block and left-side adjacent luma block of a present block.

FIG. 3 is a layout diagram of a top-side adjacent luma block and left-side adjacent luma block of a present block. As illustrated in FIG. 3, the two lists are deducted according to optimal modes for the top-side adjacent luma block (A) and left-side adjacent luma block (L) of the present block illustrated in FIG. 3.

Furthermore, for construction of the MIPMPM list, in intra prediction for VVC, if an optimal mode for the present block is an MIP mode, it is necessary to construct the MIPMPM list. During constructing the MIPMPM list, an MIP mode ABOVE_MIP corresponding to the optimal mode for the top-side adjacent luma block and an MIP mode LEFT_MIP mode corresponding to the optimal mode for the left-side adjacent luma block are required to be acquired at first.

Furthermore, after LEFT_MIP and ABOVE_MIP are acquired, an MIPMPM list including 3 most probable MIPMPM modes may be constructed according to the following method. In the MIPMPM list, the number is an MIP mode number, and the number ranges from 0 to (M−1). For a first-type luma block, the number is 0 to 34. For a second-type luma block, the number is 0 to 18. For a third-type luma block, the number is 0 to 10.

If LEFT_MIP is available (not −1), LEFT_MIP is put in MIPMPMlist.

If ABOVE_MIP is available (not −1), ABOVE_MIP is put in MIPMPMlist after redundancy check.

If LEFT_MIP is unavailable (−1) and ABOVE_MIP is unavailable (−1), a default list is added to fill MIPMPMlist according to a type of the present block after redundancy check.

A default list for a first-type luma block is {17, 34, 5}.
A default list for a second-type luma block is {0, 7, 16}.
A default list for a third-type luma block is {1, 4, 6}.

Figure 4:
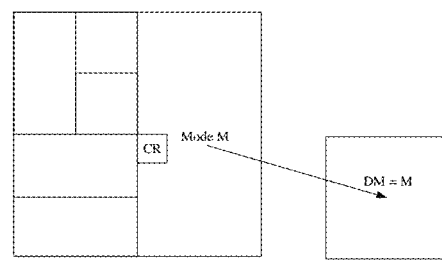
FIG. 4 is a layout diagram of determining a Direct Mode (DM).

It is to be additionally noted that, in a chroma intra prediction process for VVC, there is a component-correlation-based DM that intra prediction of a present chroma block may be performed by use of an intra prediction mode for a central position of a parity luma coding block corresponding to the present block. FIG. 4 is a layout diagram of determining a DM. As illustrated in FIG. 4, since an MIP technology is applied to luma coding blocks only, when an intra prediction mode for a CR position in FIG. 4 is an MIP mode, the MIP mode is required to be mapped to a conventional mode according to an "MIP-conventional mapping table" for intra prediction of the present chroma block.

That is, with introduction of the MIP technology, in an intra prediction process, when an MIPMPM list is constructed, it is necessary to map a conventional mode to an MIP mode, and when an MPM list is constructed and a DM is determined, it is necessary to map an MP mode to a conventional mode.

TABLE 1

| Conventional mode | MIP mode | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

In addition, it is necessary to map an MIP mode to a conventional mode in an MPM list construction process and a DM acquisition process. Specifically, 35/19/11 MIP modes are mapped to 67 conventional modes according to a "MIP-conventional mapping table". For three types of luma blocks, three "MIP-conventional mapping tables" are illustrated as Table 2, Table 3 and Table 4.

TABLE 2

| MIP mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Conventional mode | 0 | 18 | 18 | 0 | 18 | 0 | 12 | 0 | 18 | 2 | 18 | 12 | 18 | 18 | 1 | 18 | 18 | 0 |
| MIP mode | 18 | 19 | 20 | 21 | 22 | 23 | 24 | 25 | 26 | 27 | 28 | 29 | 30 | 31 | 32 | 33 | 34 | |
| Conventional mode | 0 | 50 | 0 | 50 | 0 | 56 | 0 | 50 | 66 | 50 | 56 | 50 | 50 | 1 | 50 | 50 | 50 | |

TABLE 3

| MIP mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Conventional mode | 0 | 1 | 0 | 1 | 0 | 22 | 18 | 18 | 1 | 0 | 1 | 0 | 1 | 0 | 44 | 0 | 50 | 1 | 0 |

TABLE 4

| MIP mode | 0 | 1 | 2 | 3 | 4 | 5 | 6 | 7 | 8 | 9 | 10 |
|---|---|---|---|---|---|---|---|---|---|---|---|
| Conventional mode | 1 | 1 | 1 | 1 | 18 | 0 | 1 | 0 | 1 | 50 | 0 |

Figure 5:
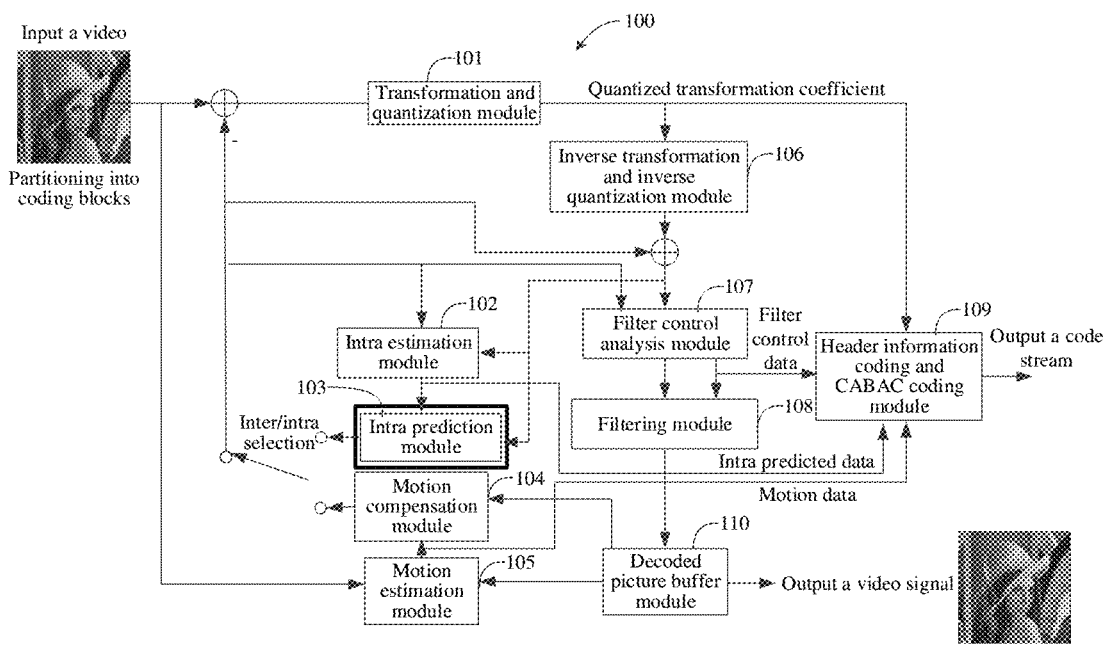
FIG. 5 is a structure diagram of a video coding system.

FIG. 5 is a structure diagram of a video coding system. As illustrated in FIG. 5, the video coding system 100 includes components such as a transformation and quantization module 101, an intra estimation module 102, an intra prediction module 103, a motion compensation module 104, a motion estimation module 105, an inverse transformation and inverse quantization module 106, a filter control analysis module 107, a deblocking filtering and Sample Adaptive Offset (SAO) filtering module 108, a header information coding and Context-based Adaptive Binary Arithmetic Coding (CABAC) module 109 and a decoded picture buffer module 110. FIG. 6 is a structure diagram of a video decoding system. As illustrated in FIG. 6, the video decoding system 200 includes components such as a header information decoding and CABAC decoding module 201, an inverse transformation and inverse quantization module 202, an intra prediction module 203, a motion compensation module 204, a deblocking filtering and SAO filtering module 205 and a decoded picture buffer module 206. After a video picture is processed through components in the video coding system 100 such as the transformation and quantization module 101, the intra estimation module 102, the intra prediction module 103, the motion compensation module 104, the motion estimation module 105, the deblocking filtering and SAO filtering module 108 and the header information coding and CABAC module 109, a code stream of the video picture is output. The code stream is input to the video decoding system 200 and processed through components in the video decoding system 200 such as the header information decoding and CABAC decoding module 201, the inverse transformation and inverse quantization module 202, the intra prediction module 203 and the motion compensation module 204 to finally recover the original video picture.

According to a height parameter and a width parameter, a present block may have 25 sizes. Specifically, it is specified in a standard that a maximum size of a luma block is 128×128. However, a maximum size of a transformation unit is 64×64, it is necessary to perform quadtree split on a luma block with a size 128×128, so that a maximum size of a luma block is 64×64. Table 5 is a schematic size table of luma blocks, as illustrated in Table 5.

TABLE 5

| | | | | |
|---|---|---|---|---|
| (4 × 4) | (4 × 8) | (4 × 16) | (4 × 32) | (4 × 64) |
| (8 × 4) | (8 × 8) | (8 × 16) | (8 × 32) | (8 × 64) |
| (16 × 4) | (16 × 8) | (16 × 16) | (16 × 32) | (16 × 64) |
| (32 × 4) | (32 × 8) | (32 × 16) | (32 × 32) | (32 × 64) |
| (64 × 4) | (64 × 8) | (64 × 16) | (64 × 32) | (64 × 64) |

In a related art, an MIP mode is restricted according to a height parameter and width parameter of a present block. Specifically, if a width-to-height ratio of the present block is greater than 4 or a height-to-width ratio is greater than 4, the present block is not coded according to the MIP mode. Table 6 illustrates restrictions on sizes of luma blocks in an MIP mode in the related art, as illustrated in Table 6.

TABLE 6

| | | | | |
|---|---|---|---|---|
| (4 × 4) | (4 × 8) | (4 × 16) | ~~(4 × 32)~~ | ~~(4 × 64)~~ |
| (8 × 4) | (8 × 8) | (8 × 16) | (8 × 32) | ~~(8 × 64)~~ |
| (16 × 4) | (16 × 8) | (16 × 16) | (16 × 32) | (16 × 64) |
| ~~(32 × 4)~~ | (32 × 8) | (32 × 16) | (32 × 32) | (32 × 64) |
| ~~(64 × 4)~~ | ~~(64 × 8)~~ | (64 × 16) | (64 × 32) | (64 × 64) |

In the related art, for a first-type luma block (corresponding to a 4×4 luma block) adopting an MIP mode, there are two top adjacent and left adjacent luma blocks respectively, and a 4×4 predicted block is generated by a matrix operation. For a second-type luma block (corresponding to a 4×8, 8×4 or 8×8 luma block) adopting an MIP mode, there are four top adjacent and left adjacent luma blocks respectively, and a 4×4 predicted block is generated by a matrix operation. For a third-type luma block adopting an MIP mode (corresponding to a luma block with another size), there are four top adjacent and left adjacent luma blocks respectively, and a 4×8 predicted block (4×16 luma block), 8×4 predicted block (16×4 luma block) or 8×8 predicted block (luma block with another size) is generated by a matrix operation. Since a non-square predicted block may be generated for a third-type luma block, odd rows of a matrix are required to be extracted during calculation.

Furthermore, in grammar, MipSizeId represents an application type of MIP, numModes represents the number of MIP modes, boundarySize represents the number of luma blocks, obtained by down-sampling, in a top reference row or a left reference column, predW represents a width parameter of a predicted block, predH represents a height parameter of the predicted block, and predC represents a side length of a matrix for MIP. Table 7 illustrates a grammatical relationship corresponding to an MIP mode in the related art. As illustrated in Table 7, MipSizeId, numModes, boundarySize, predW, predH and predC in grammar form the following relationships.

TABLE 7

| MipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min (nTbW, 8) | Min (nTbH, 8) | 8 |

Furthermore, in grammar, a value 0 of MipSizeId represents a 4×4 luma block, a value 1 represents a 4×8, 8×4 or 8×8 luma block, and a value 2 represents a luma block with another size. numModes represents the total number of MIP modes, namely there are totally 35 for a 4×4 luma block, totally 19 for a 4×8, 8×4 or 8×8 luma block and totally 11 for a luma block with another size. boundarySize represents that adjacent luma blocks in a row at the top or a column on the left of a present block are finally down-sampled to two or four adjacent luma blocks.

In the related art, luma prediction performed by an encoder in an MIP mode may be implemented through the following formula (2):

$$predMip[x][y]=((\Sigma_{i=0}^{2*boundarySize-1}mWeight[i][y*incH*predC+x*incW]*p[i])+(vBias[y*incH*predC+x*incW]<<sB)+oW)>>sW \quad (2)$$

Herein, mWeight and vBias are a weight matrix and bias matrix trained by deep learning in each MIP mode respectively. Specifically, mWeight is a weight matrix of each MIP mode, and vBias is a bias matrix of each MIP mode. sB is a left shift of the bias matrix, oW is a rounded reserved value, and sW is a right shift of an overall predicted value. Table lookup is required to obtain sW values in different MIP modes.

Based on JVET-N1001-v7, when a prediction matrix for MIP is generated, the encoder determines whether to extract predicted values of odd rows through variables incW and incH, specifically as follows:

$$oW=1<<(sW-1)$$

$$sB=BitDepth_Y-1$$

$$mipW=isTransposed?predH: predW$$

$$mipH=isTransposed?predW: predH$$

$$incW=(predC>mipW)?2:1$$

$$incH=(predC>mipH)?2:1.$$

Herein, incW=2 or incH=2 represents that extraction on the width parameter or the height parameter is required.

Table 8 illustrates grammatical descriptions about sW in the related art. As illustrated in Table 8, when and only when MipSizeId is equal to 1, namely a size of a present block is 4×8, 8×4 or 8×8 and an MIP mode number is 3, 8, 12 or 17, an sW value is 9, and sW values in all other MIP modes are 8. Since the sW values in the MIP modes are in a mapping, the sW values in all the modes may be obtained through Table 8.

TABLE 8

| MipSizeId | modeId |  |  |  |  |  |  |  |  |  |  |  |  |  |  |  |  |  |
|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 |
| 0 | 8 | 8 | 8 | 8 | 8 | 8 | 8 | 8 | 8 | 8 | 8 | 8 | 8 | 8 | 8 | 8 | 8 | 8 |
| 1 | 8 | 8 | 8 | 9 | 8 | 8 | 8 | 8 | 9 | 8 |  |  |  |  |  |  |  |  |
| 2 | 8 | 8 | 8 | 8 | 8 | 8 |  |  |  |  |  |  |  |  |  |  |  |  |

Table 9 is an mWeight matrix when MipSizeId is 1 and the MIP mode number is 3 and 12.

TABLE 9

| 218 | −56 | 9 | −3 | 411 | −76 | 12 | −4 |
| 448 | 94 | −45 | 6 | 23 | −15 | 2 | −3 |
| −1 | 476 | 77 | −34 | −5 | −2 | 1 | −3 |
| 1 | −16 | 466 | 61 | 5 | −4 | 1 | −3 |
| −38 | 2 | −3 | 0 | 260 | 358 | −77 | 8 |
| 122 | −39 | 1 | −1 | 463 | −25 | −11 | −2 |
| 405 | 54 | −41 | 5 | 121 | −33 | 2 | −6 |
| 107 | 402 | 16 | −12 | 3 | −4 | 1 | −6 |
| 5 | −1 | −1 | 0 | −62 | 267 | 375 | −73 |
| −25 | 3 | −4 | −1 | 108 | 466 | −28 | −11 |
| 58 | −25 | −3 | −1 | 418 | 96 | −35 | −3 |
| 301 | 18 | −15 | 5 | 229 | −21 | −4 | −7 |
| −1 | −3 | −2 | −2 | 24 | −95 | 291 | 297 |
| 3 | 1 | −5 | −2 | −30 | 103 | 464 | −29 |
| −16 | 0 | −6 | 0 | 41 | 429 | 70 | −13 |
| 27 | −5 | −2 | 1 | 303 | 193 | −13 | −1 |

Table 10 is a vBias matrix when MipSizeId is 1 and the MIP mode number is 3 and 12.

TABLE 10

| 1 | 2 | 3 | 1 | 1 | 3 | 3 | 3 | 2 | 4 | 4 | 4 | 3 | 5 | 5 | 5 |

Table 11 is an mWeight matrix when MipSizeId is 1 and the MIP mode number is 8 and 17. Table 12 is a vBias matrix when MipSizeId is 1 and the MIP mode number is 8 and 17.

TABLE 11

| −91 | 23 | 13 | 8 | 209 | 261 | 72 | 24 |
| −26 | −22 | 14 | 13 | 88 | 306 | 114 | 35 |
| −16 | 18 | −16 | 5 | 31 | 327 | 135 | 39 |
| −11 | 11 | 30 | −19 | 3 | 325 | 142 | 41 |
| 12 | −4 | 1 | 1 | −14 | 273 | 227 | 26 |
| 3 | 10 | −3 | −5 | 6 | 231 | 249 | 34 |
| 1 | 8 | 5 | −9 | 10 | 214 | 262 | 37 |
| −1 | 11 | 4 | −7 | 15 | 208 | 259 | 40 |
| 5 | 0 | 4 | −4 | 6 | 92 | 340 | 78 |
| 4 | 6 | 1 | −5 | 6 | 113 | 329 | 75 |
| 2 | 13 | 2 | −8 | 6 | 123 | 319 | 75 |
| 1 | 13 | 6 | −10 | 9 | 136 | 303 | 74 |
| 6 | 1 | 4 | −5 | 8 | 38 | 217 | 252 |
| 4 | 10 | 1 | −7 | 9 | 58 | 313 | 141 |
| 3 | 12 | 4 | −8 | 11 | 70 | 327 | 114 |
| 2 | 14 | 4 | −7 | 14 | 82 | 314 | 110 |

TABLE 12

| -7 | -10 | -11 | -11 | -10 | -14 | -17 | -18 | -11 | -15 | -19 | -21 | -10 | -17 | -21 | -22 |
|---|---|---|---|---|---|---|---|---|---|---|---|---|---|---|---|

Due to different grammatical descriptions about sW in different MIP modes in Table 8, when the encoder performs luma prediction according to an MIP mode, if MipSizeId of a present block is 1, namely the present block is a second-type luma block (a luma block with a 4×8, 8×4 or 8×8 size), and MIP mode numbers corresponding to the present coding block are modes 3, 8, 12 and 17, a value of sW may be different from other modes, and consequently, an algorithm is not unified. Further, querying Table 8 increases the time complexity of the algorithm, and storage of Table 8 also occupies a storage space. That is, when an MIP mode is adopted for luma prediction, parameters for luma blocks with different sizes may also be different, so a relatively large storage space is required to store a large number of parameters, and searching and calling parameters in a prediction process also prolongs total time and further reduces the coding and decoding efficiency.

For solving the above problems, the disclosure discloses a picture coding method. sW values, corresponding to MIP mode numbers 3, 8, 12 and 17, of a second-type luma block are modified to ensure that sW values corresponding to all the MIP mode numbers are the same, thereby reducing a storage space, and a table lookup operation is omitted to reduce the total time.

According to the picture coding method in the disclosure, an intra prediction part in a video coding hybrid framework may be influenced, namely the method is mainly applied to an intra prediction module 103 in video coding and an intra prediction module 203 in video decoding and acts on both an encoder and a decoder.

It is to be noted that, in the embodiments of the disclosure, for a calculation parameter obtained by training based on a machine learning method, according to picture coding and decoding methods in the disclosure, unification modification may be performed on sW according to an offset parameter with a fixed numerical value, and a corresponding weight matrix and bias matrix are modified at the same time. The disclosure is not limited to modify the sW values, corresponding to the MIP mode numbers 3, 8, 12 and 17, of the second-type luma block, and instead, unification modification is performed on different values of the calculation parameter sW obtained by training through the machine learning method after a specific parameter (including different combinations of parameters such as a size, a mode and a right shift value) changes.

In the following embodiments, the picture coding and decoding methods in the disclosure are schematically described with the sW values, corresponding to the MIP mode numbers 3, 8, 12 and 17, of the second-type luma block as examples.

The technical solutions in the embodiments of the disclosure will be clearly and completely described below in combination with the drawings in the embodiments of the disclosure.

In an embodiment of the disclosure, FIG. 7 is a first implementation flowchart of a picture coding method according to an embodiment of the disclosure. As illustrated in FIG. 7, in the embodiment of the disclosure, the picture coding method for an encoder may include the following operations.

In 101, before coding processing is performed according to an MIP mode, unification modification is performed on initial right shift parameters corresponding to different sizes and different MIP mode numbers according to an offset parameter, the offset parameter indicating the number of right shifting bits of a predicted value.

In the embodiment of the disclosure, before coding processing is performed according to the MIP mode, the encoder may set the offset parameter used for indicating the number of offset bits at first.

It is to be noted that, in the embodiment of the disclosure, based on the formula (2), the offset parameter is sW in the formula (2), namely the offset parameter is a right shift number of an overall predicted value. That is, when luma prediction is performed on a present block, the offset parameter is configured to indicate the number of right shifting bits of an overall predicted value of the present block.

Furthermore, in the embodiment of the disclosure, the encoder may set the offset parameter to be a fixed positive integer before performing coding processing according to the MIP mode. That is, after the encoder sets the offset parameter, for any present block, regardless of a size of the present block as well as an MIP mode number corresponding to the present block, an offset parameter used for the present block is determined.

It is to be noted that, in the embodiment of the disclosure, the encoder, when performing unification modification on the initial right shift parameters corresponding to different sizes and different MIP mode numbers according to the offset parameter, may set the offset parameter to be any positive integer. Specifically, the encoder may preferably set the offset parameter sW to be 6, or preferably set the offset parameter sW to be 7 or preferably set the offset parameter sW to be 8, and may also preferably set the offset parameter sW to be 9.

For example, Table 13 is a first grammatical description about sW in the disclosure. In the embodiment of the disclosure, when the encoder performs unification modification on the initial right shift parameters corresponding to different sizes and different MIP mode numbers according to the offset parameter, for a luma block with a 4×8, 8×4 or 8×8 size and corresponding to an MIP mode number 3, 8, 12 or 17, a corresponding sW thereof may be set to be a numerical value same as sW corresponding to another luma block, namely sW corresponding to the luma block with the 4×8, 8×4 or 8×8 size and corresponding to the MIP mode number 3, 8, 12 or 17 is set to be 8 when sW corresponding to another luma block is 8, so that different present blocks may have the same offset parameter sW.

TABLE 13

| MipSizeId | \multicolumn{18}{c}{modeId} |
| --- | --- | --- | --- | --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 6 | 6 | 6 | 6 | 6 | 6 | 6 | 6 | 6 | 6 | 6 | 6 | 6 | 6 | 6 |
| 1 | 6 | 6 | 6 | ~~76~~ | 6 | 6 | 6 | 6 | ~~76~~ | 6 |  |  |  |  |  |  |  |  |
| 2 | 6 | 6 | 6 | 6 | 6 | 6 |  |  |  |  |  |  |  |  |  |  |  |  |

For example, Table 14 is a second grammatical description about sW in the disclosure. In the embodiment of the disclosure, when the encoder performs unification modification on the initial right shift parameters corresponding to different sizes and different MIP mode numbers according to the offset parameter, for a luma block with a 4×8, 8×4 or 8×8 size and corresponding to an MIP mode number 3, 8, 12 or 17, a corresponding sW thereof may be set to be a numerical value same as sW corresponding to another luma block, namely sW corresponding to the luma block with the 4×8, 8×4 or 8×8 size and corresponding to the MIP mode number 3, 8, 12 or 17 is set to be 7 when sW corresponding to another luma block is 7, so that different present blocks may have the same offset parameter sW.

TABLE 14

| MipSizeId | \multicolumn{18}{c}{modeId} |
| --- | --- | --- | --- | --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 | 14 | 15 | 16 | 17 |
| 0 | 7 | 7 | 7 | 7 | 7 | 7 | 7 | 7 | 7 | 7 | 7 | 7 | 7 | 7 | 7 | 7 | 7 | 7 |
| 1 | 7 | 7 | 7 | ~~87~~ | 7 | 7 | 7 | 7 | ~~87~~ | 7 |  |  |  |  |  |  |  |  |
| 2 | 7 | 7 | 7 | 7 | 7 | 7 |  |  |  |  |  |  |  |  |  |  |  |  |

For example, Table 15 is a second grammatical description about sW in the disclosure. In the embodiment of the disclosure, when the encoder performs unification modification on the initial right shift parameters corresponding to different sizes and different MIP mode numbers according to the offset parameter, for a luma block with a 4×8, 8×4 or 8×8 size and corresponding to an MIP mode number 3, 8, 12 or 17, a corresponding sW thereof may be set to be a numerical value same as sW corresponding to another luma block, namely sW corresponding to the luma block with the 4×8, 8×4 or 8×8 size and corresponding to the MIP mode number 3, 8, 12 or 17 is set to be 8 when sW corresponding to another luma block is 8, so that different present blocks may have the same offset parameter sW.

TABLE 15

| MipSizeId | \multicolumn{18}{c}{modeId} |
| --- | --- | --- | --- | --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 | 14 | 15 | 16 | 17 |
| 0 | 8 | 8 | 8 | 8 | 8 | 8 | 8 | 8 | 8 | 8 | 8 | 8 | 8 | 8 | 8 | 8 | 8 | 8 |
| 1 | 8 | 8 | 8 | ~~98~~ | 8 | 8 | 8 | 8 | ~~98~~ | 8 |  |  |  |  |  |  |  |  |
| 2 | 8 | 8 | 8 | 8 | 8 | 8 |  |  |  |  |  |  |  |  |  |  |  |  |

As illustrated in Table 8, in the related art, different present blocks may correspond to different offset parameters sW. Specifically, when and only when MipSizeId is equal to 1, namely a present block is a second-type luma block of which a size is 4×8, 8×4 or 8×8 and an MIP mode number is 3, 8, 12 or 17, an sW value is different from sW values corresponding to all other MIP mode numbers. Therefore, the encoder, when coding the present block, is required to query and call the offset parameter sW according to the size and MIP mode number of the present block, which prolongs the total time and reduces the coding and decoding efficiency. In addition, the grammatical description table of sW is required to be stored, so a storage space is enlarged. Compared with the related art, according to the solution of the disclosure, the offset parameter sW may be set at first to ensure that offset parameters sW corresponding to all luma blocks with different sizes and different MIP mode numbers are set to be the same value before coding processing is performed according to the MIP mode, so that it is unnecessary to query and call the offset parameter sW according to the size and MIP mode number of the present block when the present block is coded, the encoder is also not required to store the grammatical description table of sW, the storage space and total time required in a coding and decoding process may further be reduced, and the coding and decoding efficiency may be effectively improved.

It is to be noted that, in the embodiment of the disclosure, although the encoder sets all the offset parameters sW corresponding to different sizes and different MIP mode numbers to be the same value when setting the offset parameter sW, when and only when MipSizeId is equal to 1, namely the present block is a second-type luma block of which a size is 4×8, 8×4 or 8×8 and an MIP mode number is 3, 8, 12 or 17, the sW value is different from the sW values corresponding to all the other MIP mode numbers. Therefore, the encoder sets the offset parameters sW corresponding to the sizes 4×8, 8×4 and 8×8 and the MIP mode numbers 3, 8, 12 and 17 when performing sW unification modification on the initial right shift parameters corresponding to different sizes and different MIP mode numbers according to the offset parameter.

In the embodiment of the disclosure, the process that the encoder performs unification modification on the initial right shift parameters corresponding to different sizes and different MIP mode numbers according to the offset parameter is to modify, when one of the initial right shift parameters is different from the offset parameter, the initial right shift parameter to the offset parameter, to ensure that the numbers of right shifting bits of all predicted values corresponding to all sizes and all MIP mode numbers are the same.

In 102, when coding processing is performed according to the MIP mode, coding processing is performed according to the offset parameter.

In the embodiment of the disclosure, after the encoder performs unification modification on the initial right shift parameters corresponding to the different sizes and the different MIP mode numbers according to the offset parameter, when the encoder performs coding processing according to the MIP mode, coding processing may be performed based on a set offset parameter.

It is to be noted that, in the embodiment of the disclosure, the encoder, after setting the offset parameter and when performing coding processing according to the MIP mode, may directly perform coding processing on the present block according to the offset parameter. Therefore, on the basis of ensuring the coding and decoding performance, the storage space and total time required in the coding and decoding process can be reduced, and the coding and decoding efficiency can be effectively improved.

In the embodiments of the disclosure, furthermore, FIG. 8 is a second implementation flowchart of a picture coding method according to an embodiment of the disclosure. As illustrated in FIG. 8, after the encoder performs unification modification on the initial right shift parameters corresponding to different sizes and different MIP mode numbers according to the offset parameter, namely after the operation in 101, the picture coding method for the encoder may further include the following operations.

In 103, an initial weight matrix and an initial bias matrix are modified according to a preset calculation rule to obtain a modified weight matrix and a modified bias matrix, the initial weight matrix and the initial bias matrix corresponding to the initial right shift parameter subjected to unification modification.

In the embodiment of the disclosure, the encoder, after performing unification modification on the initial right shift parameters corresponding to the different sizes and the different MIP mode numbers according to the offset parameter, may modify the initial weight matrix and the initial bias matrix according to the preset calculation rule, thereby obtaining the modified weight matrix and the modified bias matrix.

It is to be noted that, in the embodiment of the disclosure, the initial weight matrix and the initial bias matrix correspond to the initial right shift parameter subjected to unification modification.

It is to be noted that, in the embodiment of the disclosure, the preset calculation rule may be configured to update a corresponding initial weight matrix and initial bias matrix when a size is 4×8, 8×4 or 8×8 and an MIP mode number is 3, 8, 12 or 17.

Furthermore, in the embodiment of the disclosure, after the encoder sets the offset parameter, namely changing an offset parameter corresponding to the size 4×8, 8×4 or 8×8 and the MIP mode number 3, 8, 12 or 17, for preventing the coding and decoding performance degradation, the encoder may further perform updating processing on the corresponding initial weight matrix and initial bias matrix, thereby obtaining a modified weight matrix and a modified bias matrix.

It is to be noted that, in the embodiment of the disclosure, when the size is 4×8, 8×4 or 8×8 and the MIP mode number is 3, 8, 12 or 17, the encoder, when acquiring the modified weight matrix and the modified bias matrix according to the preset calculation rule, may update the corresponding initial weight matrix and initial bias matrix by multiple different methods. For example, when the size is 4×8, 8×4 or 8×8 and the MIP mode number is 3, 8, 12 or 17, the encoder may update any element value A in the initial weight matrix to be A/2 and simultaneously update any element value B in the initial bias matrix to be B/2 according to a rounding-down calculation rule, thereby obtaining the modified weight matrix and the modified bias matrix. Both A and B are integers. Furthermore, the encoder may also update any element value A in the initial weight matrix to be A/2 and simultaneously update any element value B in the initial bias matrix to be B/2 according to a rounding-up calculation rule, thereby obtaining the modified weight matrix and the modified bias matrix. Furthermore, the encoder may also update any element value A in the initial weight matrix to be A/2 and simultaneously update any element value B in the initial bias matrix to be B/2 according to a rounding calculation rule, thereby obtaining the modified weight matrix and the modified bias matrix.

In 104, coding processing is performed according to the offset parameter, the modified weight matrix and the modified bias matrix.

In the embodiment of the disclosure, when the encoder performs coding processing according to the MIP mode, coding processing may be performed based on the set offset parameter, the modified weight matrix and the modified bias matrix.

It is to be noted that, in the embodiment of the disclosure, after the encoder sets the offset parameter, for preventing reduction in the coding and decoding performance, the corresponding initial weight matrix and initial bias matrix are also updated to obtain the modified weight matrix and the modified bias matrix, and when coding processing is performed according to the MIP mode, coding processing may be performed on the present block according to the offset parameter, the modified weight matrix and the modified bias matrix. Therefore, on the basis of ensuring the coding and decoding performance, the storage space and total time required in the coding and decoding process may be reduced, and the coding and decoding efficiency may be effectively improved.

It is to be noted that, in the embodiment of the disclosure, the encoder, after setting the offset parameter, may also directly perform coding processing on the present block according to the offset parameter, the initial weight matrix and the initial bias matrix. That is, the encoder, after completing setting the offset parameter, may also not update the corresponding initial weight matrix and initial bias matrix.

In the related art, when an MIP mode is adopted for luma prediction of a present block, the numbers of bits required to be shifted to the right are not unified, namely offset parameters sW are different. In the picture coding method disclosed in the disclosure, the offset parameter is set in a unified manner, so that implementation of the MIP modes is simpler and more unified. Furthermore, since the offset parameters sW are different in the related art, it is necessary to store an sW table representing the numbers of right shifting bits, and query and call sW corresponding to the present block in a calculation process to determine the number of bits, required to be shifted to the right, of a predicted value calculated in the MIP mode. In the picture coding method disclosed in the disclosure, the offset parameter is set in the unified manner, so that it is unnecessary to store the sW table representing the numbers of the right shifting bits, the storage space is saved, and meanwhile, processing of querying and calling sW is omitted.

Furthermore, in the embodiment of the disclosure, the encoder, after setting the offset parameter, may further update the corresponding initial weight matrix and initial bias matrix to avoid a significant loss of the coding and decoding performance Specifically, according to a unified test standard for VVC, DB-rates on Y, U and V are 0.00%, −0.02% and −0.02% respectively, and a result under an interval of 24 frames shows coding and decoding performance similar to that under an interval of 8 frames.

According to the picture coding method disclosed in the embodiment of the disclosure, the encoder, before performing coding processing according to the MIP mode, performs unification modification on the initial right shift parameters corresponding to the different sizes and the different MIP mode numbers according to the offset parameter, the offset parameter indicating the number of the right shifting bits of the predicted value, and when performing coding processing according to the MIP mode, performs coding processing according to the offset parameter. According to the picture coding and decoding methods disclosed in the disclosure, unification modification is performed on the number of the right shifting bits of the predicted value by use of the offset parameter to ensure that all luma blocks with different sizes and different MIP mode numbers have the same sW value, so that it is unnecessary to query and call the sW value during decoding processing, the complexity of an MIP algorithm may be reduced, and on the basis of ensuring the coding and decoding performance, a storage space and total time required in a coding and decoding process may be reduced and the coding and decoding efficiency may be effectively improved.

Based on the abovementioned embodiments, in another embodiment of the disclosure, when the size is 4×8, 8×4 or 8×8 and the MIP mode number is 3, 8, 12 or 17, a method through which the encoder acquires the modified weight matrix and the modified bias matrix according to the preset calculation rule may include the following operations.

In 103a, all element values in the initial weight matrix are modified to values of the same binary order of magnitude as an element value of another weight matrix according to a rounding-down calculation rule to obtain the modified weight matrix.

In 103b, all element values in the initial bias matrix are modified to values of the same binary order of magnitude as an element value of another bias matrix according to the rounding-down calculation rule to obtain the modified bias matrix.

In the embodiment of the disclosure, when the size is 4×8, 8×4 or 8×8 and the MIP mode number is 3, 8, 12 or 17, the encoder may modify all the element values in the initial weight matrix to the values of the same binary order of magnitude as the element value of another weight matrix according to the rounding-down calculation rule and simultaneously modify all the element values in the initial bias matrix to the values of the same binary order of magnitude as the element value of another bias matrix, thereby obtaining the modified weight matrix and the modified bias matrix.

Based on Table 9, Table 16 is a modified weight matrix when MipSizeId is 1 and MIP mode numbers are 3 and 12. As illustrated in Table 16, the encoder updates each element value A in Table 9 to A/2 according to the rounding-down calculation rule, thereby obtaining the modified weight matrix when MipSizeId is 1 and the MIP mode numbers are 3 and 12.

TABLE 16

| 109 | −28 | 4 | −2 | 205 | −38 | 6 | −2 |
|---|---|---|---|---|---|---|---|
| 224 | 47 | −23 | 3 | 11 | −8 | 1 | −2 |
| −1 | 238 | 38 | −17 | −3 | −1 | 0 | −2 |
| 0 | −8 | 233 | 30 | 2 | −2 | 0 | −2 |
| −19 | 1 | −2 | 0 | 130 | 179 | −39 | 4 |
| 61 | −20 | 0 | −1 | 231 | −13 | −6 | −1 |
| 202 | 27 | −21 | 2 | 60 | −17 | 1 | −3 |
| 53 | 201 | 8 | −6 | 1 | −2 | 0 | −3 |
| 2 | −1 | −1 | 0 | −31 | 133 | 187 | −37 |
| −13 | 1 | −2 | −1 | 54 | 233 | −14 | −6 |
| 29 | −13 | −2 | −1 | 209 | 48 | −18 | −2 |
| 150 | 9 | −8 | 2 | 114 | −11 | −2 | −4 |
| −1 | −2 | −1 | −1 | 12 | −48 | 145 | 148 |
| 1 | 0 | −3 | −1 | −15 | 51 | 232 | −15 |
| −8 | 0 | −3 | 0 | 20 | 214 | 35 | −7 |
| 13 | −3 | −1 | 0 | 151 | 96 | −7 | −1 |

Based on Table 10, Table 17 is a modified bias matrix when MipSizeId is 1 and MIP mode numbers are 3 and 12. As illustrated in Table 17, the encoder updates each element value B in Table 10 to B/2 according to the rounding-down calculation rule, thereby obtaining the modified bias matrix when MipSizeId is 1 and the MIP mode numbers are 3 and 12.

TABLE 17

| 0 | 1 | 1 | 0 | 0 | 1 | 1 | 1 | 1 | 2 | 2 | 2 | 1 | 2 | 2 | 2 |
|---|---|---|---|---|---|---|---|---|---|---|---|---|---|---|---|

Based on Table 11, Table 18 is a modified weight matrix when MipSizeId is 1 and MIP mode numbers are 8 and 17. As illustrated in Table 18, the encoder updates each element value A in Table 11 to A/2 according to the rounding-down calculation rule, thereby obtaining the modified weight matrix when MipSizeId is 1 and the MIP mode numbers are 8 and 17.

TABLE 18

| −46 | 11 | 6 | 4 | 104 | 130 | 36 | 12 |
|---|---|---|---|---|---|---|---|
| −13 | −11 | 7 | 6 | 44 | 153 | 57 | 17 |
| −8 | 9 | −8 | 2 | 15 | 163 | 67 | 19 |
| −6 | 5 | 15 | −10 | 1 | 162 | 71 | 20 |
| 6 | −2 | 0 | 0 | −7 | 136 | 113 | 13 |
| 1 | 5 | −2 | −3 | 3 | 115 | 124 | 17 |
| 0 | 4 | 2 | −5 | 5 | 107 | 131 | 18 |
| −1 | 5 | 2 | −4 | 7 | 104 | 129 | 20 |
| 2 | 0 | 2 | −2 | 3 | 46 | 170 | 39 |
| 2 | 3 | 0 | −3 | 3 | 56 | 164 | 37 |
| 1 | 6 | 1 | −4 | 3 | 61 | 159 | 37 |
| 0 | 6 | 3 | −5 | 4 | 68 | 151 | 37 |
| 3 | 0 | 2 | −3 | 4 | 19 | 108 | 126 |
| 2 | 5 | 0 | −4 | 4 | 29 | 156 | 70 |
| 1 | 6 | 2 | −4 | 5 | 35 | 163 | 57 |
| 1 | 7 | 2 | −4 | 7 | 41 | 157 | 55 |

Based on Table 12, Table 19 is a modified bias matrix when MipSizeId is 1 and MIP mode numbers are 8 and 17. As illustrated in Table 22, the encoder updates each element value B in Table 12 to B/2 according to the rounding-down calculation rule, thereby obtaining the modified bias matrix when MipSizeId is 1 and the MIP mode numbers are 8 and 17.

TABLE 19

| -4 | -5 | -6 | -6 | -5 | -7 | -9 | -9 | -6 | -8 | -10 | -11 | -5 | -9 | -11 | -11 |
|---|---|---|---|---|---|---|---|---|---|---|---|---|---|---|---|

In the embodiment of the disclosure, when the size is 4×8, 8×4 or 8×8 and the MIP mode number is 3, 8, 12 or 17, the method for obtaining the modified weight matrix and the modified bias matrix by the encoder according to the preset calculation rule may include the following operations.

In 103c, all the element values in the initial weight matrix are modified to values of the same binary order of magnitude as an element value of another weight matrix according to a rounding-up calculation rule to obtain the modified weight matrix.

In 103d, all the element values in the initial bias matrix are modified to values of the same binary order of magnitude as an element value of another bias matrix according to the rounding-up calculation rule to obtain the modified bias matrix.

In the embodiment of the disclosure, when the size is 4×8, 8×4 or 8×8 and the MIP mode number is 3, 8, 12 or 17, the encoder may modify all the element values in the initial weight matrix to the values of the same binary order of magnitude as the element value of another weight matrix according to the rounding-up calculation rule and simultaneously modify all the element values in the initial bias matrix to the values of the same binary order of magnitude as the element value of another bias matrix, thereby obtaining the modified weight matrix and the modified bias matrix.

Based on Table 9, Table 20 is a modified weight matrix when MipSizeId is 1 and MIP mode numbers are 3 and 12. As illustrated in Table 20, the encoder updates each element value A in Table 9 to A/2 according to the rounding-up calculation rule, thereby obtaining the modified weight matrix when MipSizeId is 1 and the MIP mode numbers are 3 and 12.

TABLE 20

| 109 | -28 | 5 | -1 | 206 | -38 | 6 | -2 |
|---|---|---|---|---|---|---|---|
| 224 | 47 | -22 | 3 | 12 | -7 | 1 | -1 |
| 0 | 238 | 39 | -17 | -2 | -1 | 1 | -1 |
| 1 | -8 | 233 | 31 | 3 | -2 | 1 | -1 |
| -19 | 1 | -1 | 0 | 130 | 179 | -38 | 4 |
| 61 | -19 | 1 | 0 | 232 | -12 | -5 | -1 |
| 203 | 27 | -20 | 3 | 61 | -16 | 1 | -3 |
| 54 | 201 | 8 | -6 | 2 | -2 | 1 | -3 |

TABLE 20-continued

| 3 | 0 | 0 | 0 | -31 | 134 | 188 | -36 |
|---|---|---|---|---|---|---|---|
| -12 | 2 | -2 | 0 | 54 | 233 | -14 | -5 |
| 29 | -12 | -1 | 0 | 209 | 48 | -17 | -1 |
| 151 | 9 | -7 | 3 | 115 | -10 | -2 | -3 |
| 0 | -1 | -1 | -1 | 12 | -47 | 146 | 149 |
| 2 | 1 | -2 | -1 | -15 | 52 | 232 | -14 |
| -8 | 0 | -3 | 0 | 21 | 215 | 35 | -6 |
| 14 | -2 | -1 | 1 | 152 | 97 | -6 | 0 |

Based on Table 10, Table 21 is a modified bias matrix when MipSizeId is 1 and MIP mode numbers are 3 and 12. As illustrated in Table 21, the encoder updates each element value B in Table 10 to B/2 according to the rounding-up calculation rule, thereby obtaining the modified bias matrix when MipSizeId is 1 and the MIP mode numbers are 3 and 12.

TABLE 21

| 1 | 1 | 2 | 1 | 1 | 2 | 2 | 2 | 1 | 2 | 2 | 2 | 2 | 3 | 3 | 3 |
|---|---|---|---|---|---|---|---|---|---|---|---|---|---|---|---|

Based on Table 11, Table 22 is a modified weight matrix when MipSizeId is 1 and MIP mode numbers are 8 and 17. As illustrated in Table 22, the encoder updates each element value A in Table 11 to A/2 according to the rounding-up calculation rule, thereby obtaining the modified weight matrix when MipSizeId is 1 and the MIP mode numbers are 8 and 17.

TABLE 22

| -45 | 12 | 7 | 4 | 105 | 131 | 36 | 12 |
|---|---|---|---|---|---|---|---|
| -13 | -11 | 7 | 7 | 44 | 153 | 57 | 18 |
| -8 | 9 | -8 | 3 | 16 | 164 | 68 | 20 |
| -5 | 6 | 15 | -9 | 2 | 163 | 71 | 21 |
| 6 | -2 | 1 | 1 | -7 | 137 | 114 | 13 |
| 2 | 5 | -1 | -2 | 3 | 116 | 125 | 17 |
| 1 | 4 | 3 | -4 | 5 | 107 | 131 | 19 |
| 0 | 6 | 2 | -3 | 8 | 104 | 130 | 20 |
| 3 | 0 | 2 | -2 | 3 | 46 | 170 | 39 |
| 2 | 3 | 1 | -2 | 3 | 57 | 165 | 38 |
| 1 | 7 | 1 | -4 | 3 | 62 | 160 | 38 |
| 1 | 7 | 3 | -5 | 5 | 68 | 152 | 37 |
| 3 | 1 | 2 | -2 | 4 | 19 | 109 | 126 |
| 2 | 5 | 1 | -3 | 5 | 29 | 157 | 71 |
| 2 | 6 | 2 | -4 | 6 | 35 | 164 | 57 |
| 1 | 7 | 2 | -3 | 7 | 41 | 157 | 55 |

Based on Table 12, Table 23 is a modified bias matrix when MipSizeId is 1 and MIP mode numbers are 8 and 17. As illustrated in Table 23, the encoder updates each element value B in Table 12 to B/2 according to the rounding-up calculation rule, thereby obtaining the modified bias matrix when MipSizeId is 1 and the MIP mode numbers are 8 and 17.

TABLE 23

| -3 | -5 | -5 | -5 | -5 | -7 | -8 | -9 | -5 | -7 | -9 | -10 | -5 | -8 | -10 | -11 |
|---|---|---|---|---|---|---|---|---|---|---|---|---|---|---|---|

In the embodiment of the disclosure, furthermore, when the size is 4×8, 8×4 or 8×8 and the MIP mode number is 3, 8, 12 or 17, the method for obtaining the modified weight matrix and the modified bias matrix by the encoder according to the preset calculation rule may include the following operations.

In 103e, all the element values in the initial weight matrix are modified to values of the same binary order of magnitude as an element value of another weight matrix according to a rounding calculation rule to obtain the modified weight matrix.

In 103f, all the element values in the initial bias matrix are modified to values of the same binary order of magnitude as an element value of another bias matrix according to the rounding calculation rule to obtain the modified bias matrix.

In the embodiment of the disclosure, when the size is 4×8, 8×4 or 8×8 and the MIP mode number is 3, 8, 12 or 17, the encoder may modify all the element values in the initial weight matrix to the values of the same binary order of magnitude as the element value of the other weight matrix according to the rounding calculation rule and simultaneously modify all the element values in the initial bias matrix to the values of the same binary order of magnitude as the element value of the other bias matrix, thereby obtaining the modified weight matrix and the modified bias matrix.

Based on Table 9, Table 24 is a modified weight matrix when MipSizeId is 1 and MIP mode numbers are 3 and 12. As illustrated in Table 24, the encoder updates each element value A in Table 9 to A/2 according to the rounding calculation rule, thereby obtaining the modified weight matrix when MipSizeId is 1 and the MIP mode numbers are 3 and 12.

TABLE 24

| 109 | −28 | 5   | −2  | 206 | −38 | 6   | −2 |
| --- | --- | --- | --- | --- | --- | --- | --- |
| 224 | 47  | −23 | 3   | 12  | −8  | 1   | −2 |
| −1  | 238 | 39  | −17 | −3  | −1  | 1   | −2 |
| 1   | −8  | 233 | 31  | 3   | −2  | 1   | −2 |
| −19 | 1   | −2  | 0   | 130 | 179 | −39 | 4  |
| 61  | −20 | 1   | −1  | 232 | −13 | −6  | −1 |
| 203 | 27  | −21 | 3   | 61  | −17 | 1   | −3 |
| 54  | 201 | 8   | −6  | 2   | −2  | 1   | −3 |

TABLE 24-continued

| 3   | −1  | −1  | 0   | −31 | 134 | 188 | −37 |
| --- | --- | --- | --- | --- | --- | --- | --- |
| −13 | 2   | −2  | −1  | 54  | 233 | −14 | −6  |
| 29  | −13 | −2  | −1  | 209 | 48  | −18 | −2  |
| 151 | 9   | −8  | 3   | 115 | −11 | −2  | −4  |
| −1  | −2  | −1  | −1  | 12  | −48 | 146 | 149 |
| 2   | 1   | −3  | −1  | −15 | 52  | 232 | −15 |
| −8  | 0   | −3  | 0   | 21  | 215 | 35  | −7  |
| 14  | −3  | −1  | 1   | 152 | 97  | −7  | −1  |

Based on Table 10, Table 25 is a modified bias matrix when MipSizeId is 1 and MIP mode numbers are 3 and 12. As illustrated in Table 25, the encoder updates each element value B in Table 10 to B/2 according to the rounding calculation rule, thereby obtaining the modified bias matrix when MipSizeId is 1 and the MIP mode numbers are 3 and 12.

TABLE 25

| 1 | 1 | 2 | 1 | 1 | 2 | 2 | 2 | 1 | 2 | 2 | 2 | 2 | 3 | 3 | 3 |
| --- | --- | --- | --- | --- | --- | --- | --- | --- | --- | --- | --- | --- | --- | --- | --- |

Based on Table 11, Table 26 is a modified weight matrix when MipSizeId is 1 and MIP mode numbers are 8 and 17. As illustrated in Table 26, the encoder updates each element value A in Table 11 to A/2 according to the rounding calculation rule, thereby obtaining the modified weight matrix when MipSizeId is 1 and the MIP mode numbers are 8 and 17.

TABLE 26

| −46 | 12  | 7   | 4   | 105 | 131 | 36  | 12  |
| --- | --- | --- | --- | --- | --- | --- | --- |
| −13 | −11 | 7   | 7   | 44  | 153 | 57  | 18  |

TABLE 26-continued

| −8  | 9   | −8  | 3   | 16  | 164 | 68  | 20  |
| --- | --- | --- | --- | --- | --- | --- | --- |
| −6  | 6   | 15  | −10 | 2   | 163 | 71  | 21  |
| 6   | −2  | 1   | 1   | −7  | 137 | 114 | 13  |
| 2   | 5   | −2  | −3  | 3   | 116 | 125 | 17  |
| 1   | 4   | 3   | −5  | 5   | 107 | 131 | 19  |
| −1  | 6   | 2   | −4  | 8   | 104 | 130 | 20  |
| 3   | 0   | 2   | −2  | 3   | 46  | 170 | 39  |
| 2   | 3   | 1   | −3  | 3   | 57  | 165 | 38  |
| 1   | 7   | 1   | −4  | 3   | 62  | 160 | 38  |
| 1   | 7   | 3   | −5  | 5   | 68  | 152 | 37  |
| 3   | 1   | 2   | −3  | 4   | 19  | 109 | 126 |
| 2   | 5   | 1   | −4  | 5   | 29  | 157 | 71  |
| 2   | 6   | 2   | −4  | 6   | 35  | 164 | 57  |
| 1   | 7   | 2   | −4  | 7   | 41  | 157 | 55  |

Based on Table 12, Table 27 is a modified bias matrix when MipSizeId is 1 and MIP mode numbers are 8 and 17. As illustrated in Table 27, the encoder updates each element value B in Table 12 to B/2 according to the rounding calculation rule, thereby obtaining the modified bias matrix when MipSizeId is 1 and the MIP mode numbers are 8 and 17.

TABLE 27

| −4 | −5 | −6 | −6 | −5 | −7 | −9 | −9 | −6 | −8 | −10 | −11 | −5 | −9 | −11 | −11 |
| --- | --- | --- | --- | --- | --- | --- | --- | --- | --- | --- | --- | --- | --- | --- | --- |

According to the picture coding method disclosed in the embodiments of the disclosure, the encoder, before performing coding processing according to the MIP mode, performs unification modification on the initial right shift parameters corresponding to the different sizes and the different MIP mode numbers according to the offset parameter, the offset parameter being used to indicate the number of the right shifting bits of the predicted value, and when performing coding processing according to the MIP mode, performs coding processing according to the offset parameter. According to the picture coding and decoding methods disclosed in the disclosure, unification modification is performed on the number of the right shifting bits of the predicted value by use of the offset parameter to ensure that all luma blocks with different sizes and different MIP mode numbers have the same sW value, so that it is unnecessary to query and call the sW value during coding and decoding processing, the complexity of an MIP algorithm may be reduced, and on the basis of ensuring the coding and decoding performance, a storage space and total time required in a coding and decoding process may be reduced and the coding and decoding efficiency may be effectively improved.

Figure 9:
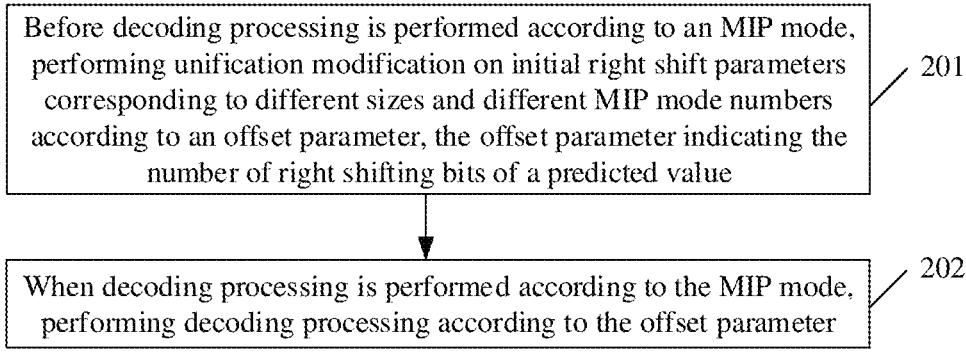
FIG. 9 is a first implementation flowchart of a picture decoding method according to an embodiment of the disclosure.

In another embodiment of the disclosure, FIG. 9 is a first implementation flowchart of a picture decoding method according to an embodiment of the disclosure. As illustrated in FIG. 9, in the embodiment of the disclosure, the picture decoding method for a decoder may include the following operations.

In 201, before decoding processing is performed according to an MIP mode, unification modification is performed on initial right shift parameters corresponding to different sizes and different MIP mode numbers according to an offset parameter, the offset parameter indicating the number of right shifting bits of a predicted value.

In the embodiment of the disclosure, before decoding processing is performed according to the MIP mode, the decoder may set the offset parameter used for indicating the number of offset bits at first.

It is to be noted that, in the embodiment of the disclosure, based on the formula (2), the offset parameter is sW in the formula (2), namely the offset parameter is a right shift number of an overall predicted value. That is, when luma prediction is performed on a present block, the offset parameter is configured to indicate the number of right shifting bits of an overall predicted value of the present block.

Furthermore, in the embodiment of the disclosure, the decoder may set the offset parameter to be a fixed positive integer before performing decoding processing according to the MIP mode. That is, after the decoder sets the offset parameter, for any present block, regardless of a size of the present block as well as an MIP mode number corresponding to the present block, an offset parameter used for the present block is determined.

It is to be noted that, in the embodiment of the disclosure, the decoder, when performing unification modification on the initial right shift parameters corresponding to different sizes and different MIP mode numbers according to the offset parameter, may set the offset parameter to be any positive integer. Specifically, the decoder may preferably set the offset parameter sW to be 6, or preferably set the offset parameter sW to be 7 or preferably set the offset parameter sW to be 8, and may also preferably set the offset parameter sW to be 9.

In the related art, different present blocks may correspond to different offset parameters sW. Specifically, when and only when MipSizeId is equal to 1, namely a present block is a second-type luma block of which a size is 4×8, 8×4 or 8×8 and an MIP mode number is 3, 8, 12 or 17, an sW value is different from sW values corresponding to all other MIP mode numbers. Therefore, the decoder, when decoding the present block, is required to query and call the offset parameter sW according to the size and MIP mode number of the present block, which prolongs the total time and reduces the coding and decoding efficiency. In addition, the grammatical description table of sW is required to be stored, so a storage space is enlarged. Compared with the related art, according to the solution of the disclosure, the offset parameter sW may be set at first to ensure that offset parameters sW corresponding to all luma blocks with different sizes and different MIP mode numbers are set to be the same value before decoding processing is performed according to the MIP mode, so that it is unnecessary to query and call the offset parameter sW according to the size and MIP mode number of the present block when the present block is decoded, the decoder is also not required to store the grammatical description table of sW, the storage space and total time required in a coding and decoding process may further be reduced, and the coding and decoding efficiency may be effectively improved.

It is to be noted that, in the embodiment of the disclosure, although the decoder sets all the offset parameters sW corresponding to different sizes and different MIP mode numbers to be the same value when setting the offset parameter sW, when and only when MipSizeId is equal to 1, namely the present block is a second-type luma block of which a size is 4×8, 8×4 or 8×8 and an MIP mode number is 3, 8, 12 or 17, the sW value is different from the sW values corresponding to all the other MIP mode numbers. Therefore, the decoder sets the offset parameters sW corresponding to the sizes 4×8, 8×4 and 8×8 and the MIP mode numbers 3, 8, 12 and 17 when performing sW unification modification on the initial right shift parameters corresponding to different sizes and different MIP mode numbers according to the offset parameter.

In the embodiment of the disclosure, the process that the decoder performs unification modification on the initial right shift parameters corresponding to different sizes and different MIP mode numbers according to the offset parameter is to modify, when an initial right shift parameter is different from the offset parameter, the initial right shift parameter to the offset parameter, so as to enable the numbers of right shifting bits of all predicted values corresponding to all sizes and all MIP mode numbers to be the same.

In 202, when decoding processing is performed according to the MIP mode, decoding processing is performed according to the offset parameter.

In the embodiment of the disclosure, after the decoder performs unification modification on the initial right shift parameters corresponding to different sizes and different MIP mode numbers according to the offset parameter, when the decoder performs decoding processing according to the MIP mode, decoding processing may be performed based on a set offset parameter.

It is to be noted that, in the embodiment of the disclosure, the decoder, after setting the offset parameter and when performing decoding processing according to the MIP mode, may directly perform decoding processing on the present block according to the offset parameter. Therefore, on the basis of ensuring the coding and decoding performance, the storage space and total time required in the coding and decoding process can be reduced, and the coding and decoding efficiency can be effectively improved.

Figure 10:
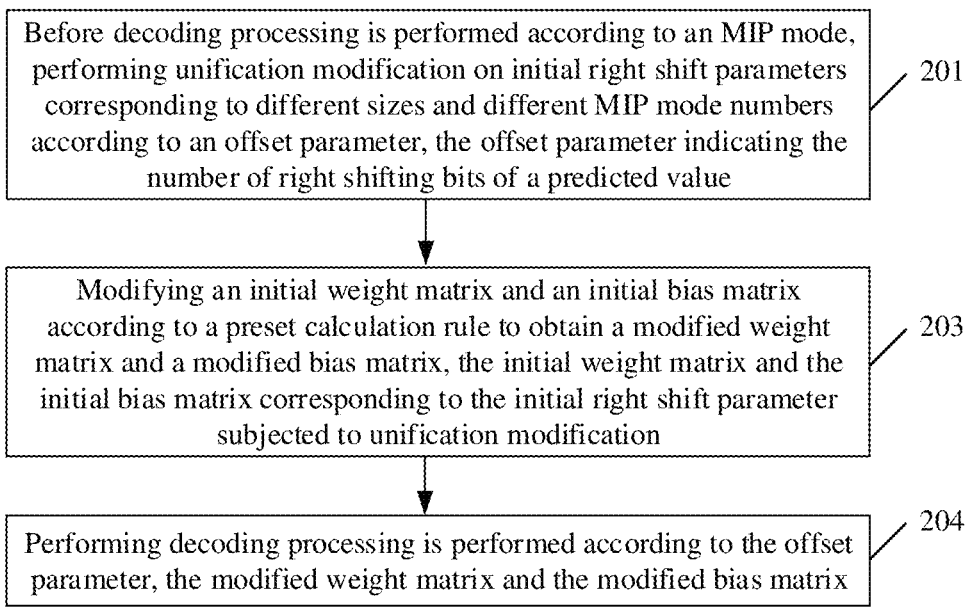
FIG. 10 is a second implementation flowchart of a picture decoding method according to an embodiment of the disclosure.

In the embodiments of the disclosure, furthermore, FIG. 10 is a second implementation flowchart of a picture decoding method according to an embodiment of the disclosure. As illustrated in FIG. 10, after the decoder performs unification modification on the initial right shift parameters corresponding to different sizes and different MIP mode numbers according to the offset parameter, namely after the operation in 201, the picture decoding method for the decoder may further include the following operations.

In 203, an initial weight matrix and an initial bias matrix are modified according to a preset calculation rule to obtain a modified weight matrix and a modified bias matrix, the initial weight matrix and the initial bias matrix corresponding to the initial right shift parameter subjected to unification modification.

In the embodiment of the disclosure, the decoder, after performing unification modification on the initial right shift parameters corresponding to the different sizes and the different MIP mode numbers according to the offset parameter, may modify the initial weight matrix and the initial bias matrix according to the preset calculation rule, thereby obtaining the modified weight matrix and the modified bias matrix.

It is to be noted that, in the embodiment of the disclosure, the initial weight matrix and the initial bias matrix correspond to the initial right shift parameter subjected to unification modification.

It is to be noted that, in the embodiment of the disclosure, the preset calculation rule may be configured to update a corresponding initial weight matrix and initial bias matrix when a size is 4×8, 8×4 or 8×8 and an MIP mode number is 3, 8, 12 or 17.

Furthermore, in the embodiment of the disclosure, after the decoder sets the offset parameter, namely changing an offset parameter corresponding to the size 4×8, 8×4 or 8×8 and the MIP mode number 3, 8, 12 or 17, for preventing the coding and decoding performance degradation, the decoder may further perform updating processing on the corresponding initial weight matrix and initial bias matrix, thereby obtaining a modified weight matrix and a modified bias matrix.

It is to be noted that, in the embodiment of the disclosure, when the size is 4×8, 8×4 or 8×8 and the MIP mode number is 3, 8, 12 or 17, the decoder, when acquiring the modified weight matrix and the modified bias matrix according to the preset calculation rule, may update the corresponding initial weight matrix and initial bias matrix by multiple different methods. For example, when the size is 4×8, 8×4 or 8×8 and the MIP mode number is 3, 8, 12 or 17, the decoder may update any element value A in the initial weight matrix to be A/2 and simultaneously update any element value B in the initial bias matrix to be B/2 according to a rounding-down calculation rule, thereby obtaining the modified weight matrix and the modified bias matrix. Both A and B are integers. Furthermore, the decoder may also update any element value A in the initial weight matrix to be A/2 and simultaneously update any element value B in the initial bias matrix to be B/2 according to a rounding-up calculation rule, thereby obtaining the modified weight matrix and the modified bias matrix. Furthermore, the decoder may also update any element value A in the initial weight matrix to be A/2 and simultaneously update any element value B in the initial bias matrix to be B/2 according to a rounding calculation rule, thereby obtaining the modified weight matrix and the modified bias matrix.

In 204, decoding processing is performed according to the offset parameter, the modified weight matrix and the modified bias matrix.

In the embodiment of the disclosure, when the decoder performs decoding processing according to the MIP mode, decoding processing may be performed based on the set offset parameter, the modified weight matrix and the modified bias matrix.

It is to be noted that, in the embodiment of the disclosure, after the decoder sets the offset parameter, for preventing reduction in the coding and decoding performance, the corresponding initial weight matrix and initial bias matrix are also updated to obtain the modified weight matrix and the modified bias matrix, and when decoding processing is performed according to the MIP mode, decoding processing may be performed on the present block according to the offset parameter, the modified weight matrix and the modified bias matrix. Therefore, on the basis of ensuring the coding and decoding performance, the storage space and total time required in the coding and decoding process may be reduced, and the coding and decoding efficiency may be effectively improved.

It is to be noted that, in the embodiment of the disclosure, the decoder, after setting the offset parameter, may also directly perform decoding processing on the present block according to the offset parameter, the initial weight matrix and the initial bias matrix. That is, the decoder, after completing setting the offset parameter, may also not update the corresponding initial weight matrix and initial bias matrix.

In the related art, when an MIP mode is adopted for luma prediction of a present block, the numbers of bits required to be shifted to the right are not unified, namely offset parameters sW are different. In the picture decoding method disclosed in the disclosure, the offset parameter is set in a unified manner, so that implementation of the MIP modes is simpler and more unified. Furthermore, since the offset parameters sW are different in the related art, it is necessary to store an sW table representing the numbers of right shifting bits, and query and call sW corresponding to the present block in a calculation process to determine the number of bits, required to be shifted to the right, of a predicted value calculated in the MIP mode. In the picture decoding method disclosed in the disclosure, the offset parameter is set in the unified manner, so that it is unnecessary to store the sW table representing the numbers of the right shifting bits, the storage space is saved, and meanwhile, processing of querying and calling sW is omitted.

According to the picture decoding method disclosed in the embodiment of the disclosure, the decoder, before performing decoding processing according to the MIP mode, performs unification modification on the initial right shift parameters corresponding to the different sizes and the different MIP mode numbers according to the offset parameter, the offset parameter indicating the number of the right shifting bits of the predicted value, and when performing decoding processing according to the MIP mode, performs decoding processing according to the offset parameter. According to the picture coding and decoding methods disclosed in the disclosure, unification modification is performed on the number of the right shifting bits of the predicted value by use of the offset parameter to ensure that all luma blocks with different sizes and different MIP mode numbers have the same sW value, so that it is unnecessary to query and call the sW value during coding and decoding processing, the complexity of an MIP algorithm may be reduced, and on the basis of ensuring the coding and decoding performance, a storage space and total time required in a coding and decoding process may be reduced and the coding and decoding efficiency may be effectively improved.

Figure 11:
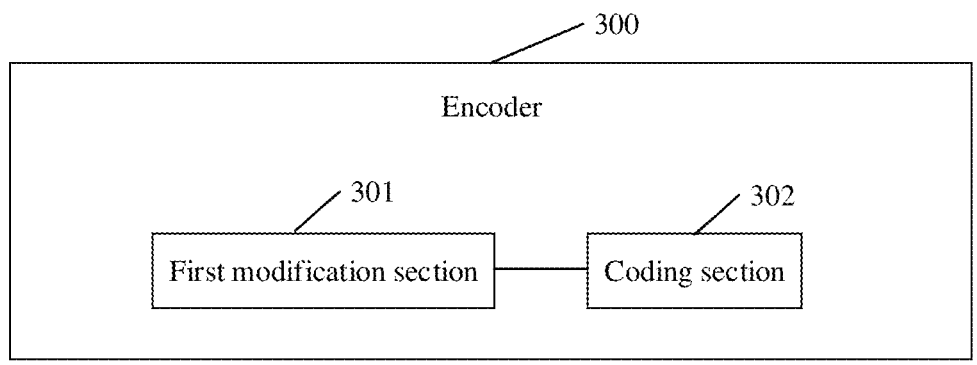
FIG. 11 is a first structure diagram of an encoder according to an embodiment of the disclosure.

Based on the abovementioned embodiments, in another embodiment of the disclosure, FIG. 11 is a first structure diagram of an encoder according to an embodiment of the disclosure. As illustrated in FIG. 11, the encoder 300 disclosed in the embodiment of the disclosure may include a first modification section 301 and a coding section 302.

The first modification section 301 is configured to, before coding processing is performed according to an MIP mode, perform unification modification on initial right shift parameters corresponding to different sizes and different MIP mode numbers according to an offset parameter. The offset parameter indicates the number of right shifting bits of a predicted value.

The coding section 302 is configured to, when coding processing is performed according to the MIP mode, perform coding processing according to the offset parameter.

The first modification section 301 is specifically configured to, when an initial right shift parameter is different from the offset parameter, modify the initial right shift parameter to the offset parameter, to enable the numbers of right shifting bits of all predicted values corresponding to all sizes and all MIP mode numbers to be the same.

Figure 12:
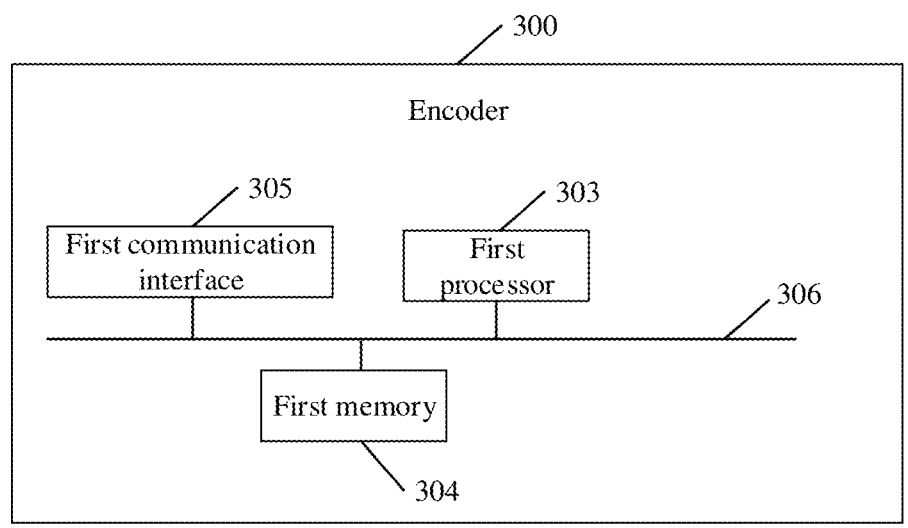
FIG. 12 is a second structure diagram of an encoder according to an embodiment of the disclosure.

FIG. 12 is a second structure diagram of an encoder according to an embodiment of the disclosure. As illustrated in FIG. 12, the encoder 300 disclosed in the embodiment of the disclosure may also include a first processor 303, a first memory 304 storing an instruction executable for the first processor 303, a first communication interface 305 and a first bus 306 configured to connect the first processor 303, the first memory 304 and the first communication interface 305.

Furthermore, in the embodiment of the disclosure, the first processor 303 is configured to, before performing coding processing according to an MIP mode, perform unification modification on initial right shift parameters corresponding to different sizes and different MIP mode numbers according to an offset parameter, the offset parameter indicating the number of right shifting bits of a predicted value, and when performing coding processing according to the MIP mode, perform coding processing according to the offset parameter.

In addition, each functional module in the embodiment may be integrated into a processing unit, each unit may also exist independently, and two or more than two units may also be integrated into a unit. The integrated unit may be implemented in a hardware form and may also be implemented in form of software function module.

When implemented in form of a software function module and sold or used not as an independent product, the integrated unit may be stored in a computer-readable storage medium. Based on such an understanding, the technical solution of the embodiment substantially or parts making contributions to the related art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes various media capable of storing program codes such as a U disk, a mobile hard disk, a Read-Only Memory (ROM), a Random Access Memory (RAM), a magnetic disk or an optical disk.

The embodiment of the disclosure provides an encoder. The encoder, before performing coding processing according to an MIP mode, performs unification modification on initial right shift parameters corresponding to different sizes and different MIP mode numbers according to an offset parameter, the offset parameter indicating the number of right shifting bits of a predicted value, and when performing coding processing according to the MIP mode, performs coding processing according to the offset parameter. According to the picture coding and decoding methods disclosed in the disclosure, unification modification is performed on the number of the right shifting bits of the predicted value by use of the offset parameter to ensure that all luma blocks with different sizes and different MIP mode numbers have the same sW value. Therefore, it is unnecessary to query and call the sW value during coding and decoding processing, the complexity of an MIP algorithm may be reduced, and on the basis of ensuring the coding and decoding performance, a storage space and total time required in a coding and decoding process may be reduced and the coding and decoding efficiency may be effectively improved.

Figure 13:
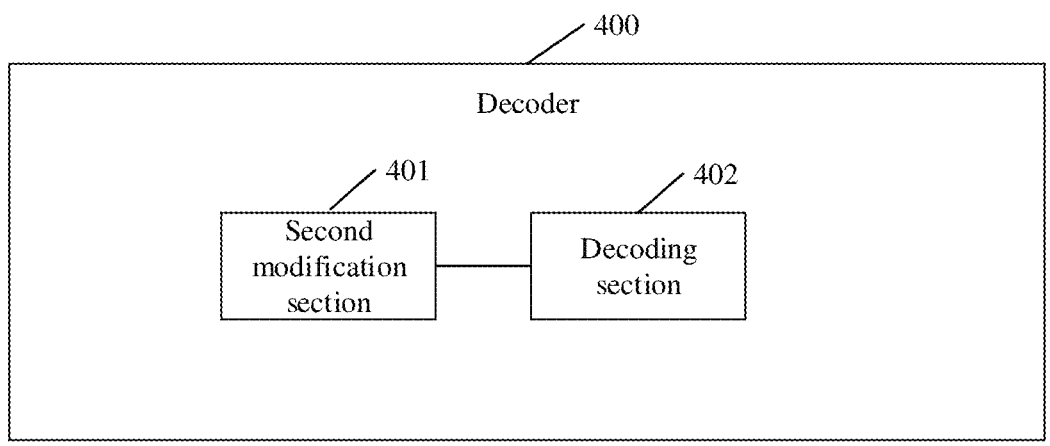
FIG. 13 is a first structure diagram of a decoder according to an embodiment of the disclosure.

FIG. 13 is a first structure diagram of a decoder according to an embodiment of the disclosure. As illustrated in FIG. 13, the decoder 400 disclosed in the embodiment of the disclosure may include a second modification section 401 and a decoding section 402.

The second modification section 401 is configured to, before decoding processing is performed according to an MIP mode, perform unification modification on initial right shift parameters corresponding to different sizes and different MIP mode numbers according to an offset parameter. The offset parameter indicates the number of right shifting bits of a predicted value.

The decoding section 402 is configured to, when decoding processing is performed according to the MIP mode, perform decoding processing according to the offset parameter.

The second modification section 401 is specifically configured to, when an initial right shift parameter is different from the offset parameter, modify the initial right shift parameter to the offset parameter, to enable the numbers of right shifting bits of all predicted values corresponding to all sizes and all MIP mode numbers to be the same.

Figure 14:
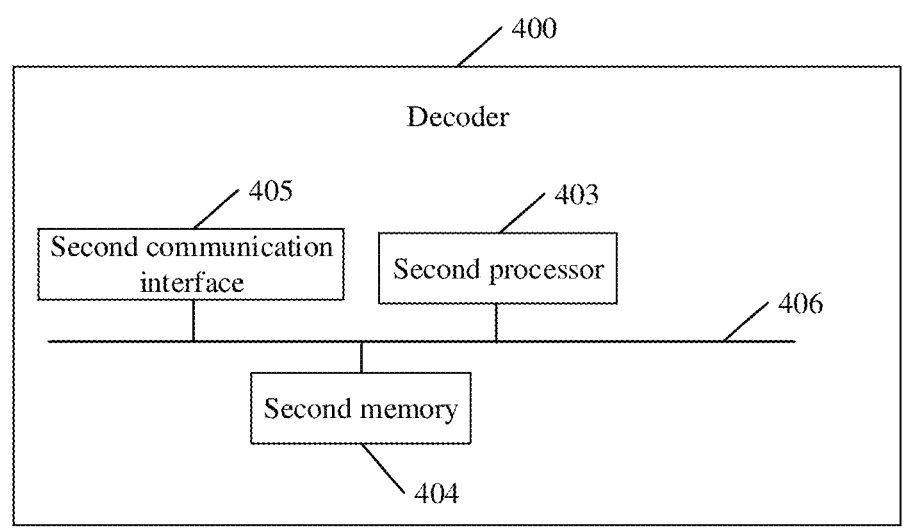
FIG. 14 is a second structure diagram of a decoder according to an embodiment of the disclosure.

FIG. 14 is a second structure diagram of a decoder according to an embodiment of the disclosure. As illustrated in FIG. 14, the decoder 400 disclosed in the embodiment of the disclosure may also include a second processor 403, a second memory 404 storing an instruction executable for the second processor 403, a second communication interface 405 and a second bus 406 configured to connect the second processor 403, the second memory 404 and the second communication interface 405.

Furthermore, in the embodiment of the disclosure, the second processor 403 is configured to, before performing decoding processing according to an MIP mode, perform unification modification on initial right shift parameters corresponding to different sizes and different MIP mode numbers according to an offset parameter, the offset parameter indicating the number of right shifting bits of a predicted value, and when performing decoding processing according to the MIP mode, perform decoding processing according to the offset parameter.

In addition, each functional module in the embodiment may be integrated into a processing unit, each unit may also exist independently, and two or more than two units may also be integrated into a unit. The integrated unit may be implemented in a hardware form and may also be implemented in form of software function module.

When implemented in form of a software function module and sold or used not as an independent product, the integrated unit may be stored in a computer-readable storage medium. Based on such an understanding, the technical solution of the embodiment substantially or parts making contributions to the related art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes various media capable of storing program codes such as a U disk, a mobile hard disk, a ROM, a RAM, a magnetic disk or an optical disk.

The embodiment of the disclosure provides a decoder. The decoder, before performing decoding processing according to an MIP mode, performs unification modification on initial right shift parameters corresponding to different sizes and different MIP mode numbers according to an offset parameter, and when performing decoding processing according to the MIP mode, performs decoding processing according to the offset parameter. According to the picture coding and decoding methods disclosed in the disclosure, unification modification is performed on the number of the right shifting bits of the predicted value by use of the offset parameter to ensure that all luma blocks with different sizes and different MIP mode numbers have the same sW value. Therefore, it is unnecessary to query and call the sW value during coding and decoding processing, the complexity of an MIP algorithm may be reduced, and on the basis of ensuring the coding and decoding performance, a storage space and total time required in a coding and decoding process may be reduced and the coding and decoding efficiency may be effectively improved.

The embodiments of the disclosure provide a computer-readable storage medium, having stored thereon one or more programs. The programs are executed by a processor to implement the methods as described in the abovementioned embodiments.

Specifically, a program instruction corresponding to a picture coding method in the embodiments may be stored in a storage medium such as an optical disk, a hard disk and a U disk. When the program instruction corresponding to the picture coding method in the storage medium is read or executed by an electronic device, the following operations are included.

Before coding processing is performed according to an MIP mode, unification modification is performed on initial right shift parameters corresponding to different sizes and different MIP mode numbers according to an offset parameter. The offset parameter indicates the number of right shifting bits of a predicted value.

When coding processing is performed according to the MIP mode, coding processing is performed according to the offset parameter.

Specifically, a program instruction corresponding to a picture decoding method in the embodiments may be stored in a storage medium such as an optical disk, a hard disk and a U disk. When the program instruction corresponding to the picture decoding method in the storage medium is read or executed by an electronic device, the following operations are included.

Before decoding processing is performed according to an MIP mode, unification modification is performed on initial right shift parameters corresponding to different sizes and different MIP mode numbers according to an offset parameter. The offset parameter indicates the number of right shifting bits of a predicted value.

When decoding processing is performed according to the MIP mode, decoding processing is performed according to the offset parameter.

Those skilled in the art may realize that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to implementation flowcharts and/or block diagrams of the method, device (system) and computer program product according to the embodiments of the disclosure. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a universal computer, a dedicated computer, an embedded processor or a processor of another programmable data processing device to generate a machine, so as to generate a device for realizing a function specified in one flow or multiple flows in the implementation flowcharts and/or one block or multiple blocks in the block diagrams through the instructions executed through the computer or the processor of another programmable data processing device.

These computer program instructions may also be stored in a computer-readable memory capable of guiding the computer or another programmable data processing device to operate in a specific manner, so as to generate a product including an instruction device by the instructions stored in the computer-readable memory. The instruction device realizes the function specified in one flow or multiple flows in the implementation flowcharts and/or one block or multiple blocks in the block diagrams.

These computer program instructions may further be loaded onto the computer or the other programmable data processing device, so that a series of operations are executed on the computer or the other programmable data processing device to generate computer-implemented processing, and operations for realizing the function specified in one flow or multiple flows in the implementation flowcharts and/or one block or multiple blocks in the block diagrams are provided by the instructions executed on the computer or the other programmable data processing device.

The above is only the preferred embodiments of the disclosure and not intended to limit the scope of protection of the disclosure.

INDUSTRIAL APPLICABILITY

The embodiments of the disclosure provide picture coding and decoding methods, an encoder, a decoder and a storage medium. The encoder, before performing coding processing according to an MIP mode, performs unification modification on initial right shift parameters corresponding to different sizes and different MIP mode numbers according to an offset parameter, the offset parameter indicating the number of right shifting bits of a predicted value, and when performing coding processing according to the MIP mode, performs coding processing according to the offset parameter. The decoder, before performing decoding processing according to an MIP mode, performs unification modification on initial right shift parameters corresponding to different sizes and different MIP mode numbers according to an offset parameter, and when performing decoding processing according to the MIP mode, performs decoding processing according to the offset parameter. According to the picture coding and decoding methods in the disclosure, unification modification is performed on the number of the right shifting bits of the predicted value by use of the offset parameter to ensure that all luma blocks with different sizes and different MIP mode numbers have the same sW value, so that it is unnecessary to query and call the sW value during coding and decoding processing, complexity of an MIP algorithm may be reduced, and on the basis of ensuring the coding and decoding performance, a storage space and total time required in a coding and decoding process may be reduced and the coding and decoding efficiency may be effectively improved.

The invention claimed is:

1. A picture coding method, applied to an encoder and comprising:
   determining a mode parameter of a current block; and
   in response to a determination that the mode parameter indicates that a prediction value of the current block is determined according to a matrix-based intra prediction (MIP) mode, performing prediction on the current block according to the MIP mode based on an initial right shift parameter, wherein the initial right shift parameter is a uniform offset parameter, and the offset parameter indicates a number of right shifting bits of the prediction value, wherein the offset parameter is set to be 6.

2. The method of claim 1, further comprising:
   determining initial right shift parameters corresponding to MIP mode numbers as the uniform offset parameter.

3. The method of claim 2, wherein determining the initial right shift parameters corresponding to MIP mode numbers as the uniform offset parameter comprises:
when one of initial right shift parameters is different from the offset parameter, modifying the initial right shift parameter to the offset parameter, to enable the numbers of right shifting bits of all prediction values corresponding to all sizes and all MIP mode numbers to be the same.

4. The method of claim 2, wherein after determining the initial right shift parameters corresponding to MIP mode numbers as the uniform offset parameter, further comprising:
modifying an initial weight matrix and an initial bias matrix according to a preset calculation rule to obtain a modified weight matrix and a modified bias matrix, the initial weight matrix and the initial bias matrix corresponding to an initial right shift parameter subjected to unification modification; and
performing prediction on the current block according to the offset parameter, the modified weight matrix and the modified bias matrix.

5. The method of claim 2, wherein after determining the initial right shift parameters corresponding to MIP mode numbers as the uniform offset parameter, further comprising:
performing prediction on the current block according to the offset parameter, an initial weight matrix and an initial bias matrix.

6. A picture decoding method, applied to a decoder and comprising:
determining a mode parameter of a current block; and
in response to a determination that the mode parameter indicates that a prediction value of the current block is determined according to a matrix-based intra prediction (MIP) mode, performing prediction on the current block according to the MIP mode based on an initial right shift parameter, wherein the initial right shift parameter is an uniform offset parameter, and the offset parameter indicates a number of right shifting bits of the prediction value, wherein the offset parameter is set to be 6.

7. The method of claim 6, further comprising:
determining initial right shift parameters corresponding to MIP mode numbers as the uniform offset parameter.

8. The method of claim 7, wherein determining the initial right shift parameters corresponding to MIP mode numbers as the uniform offset parameter comprises:
when one of the initial right shift parameters is different from the offset parameter, modifying the initial right shift parameter to the offset parameter, to enable the numbers of right shifting bits of all prediction values corresponding to all sizes and all MIP mode numbers to be the same.

9. The method of claim 7, wherein after determining the initial right shift parameters corresponding to MIP mode numbers as the uniform offset parameter, further comprising:
modifying an initial weight matrix and an initial bias matrix according to a preset calculation rule to obtain a modified weight matrix and a modified bias matrix, the initial weight matrix and the initial bias matrix corresponding to an initial right shift parameter subjected to unification modification; and
performing prediction on the current block according to the offset parameter, the modified weight matrix and the modified bias matrix.

10. The method of claim 7, wherein after determining the initial right shift parameters corresponding to MIP mode numbers as the uniform offset parameter, further comprising:
performing prediction on the current block according to the offset parameter, an initial weight matrix and an initial bias matrix.

11. A decoder, comprising a processor, a memory storing an instruction executable for the processor, a communication interface and a bus configured to connect the processor, the memory and the communication interface, wherein the processor is configured to perform, when running the instruction, operations of:
determining a mode parameter of a current block; and
in response to a determination that the mode parameter indicates that a prediction value of the current block is determined according to a matrix-based intra prediction (MIP) mode, performing prediction on the current block according to the MIP mode based on an initial right shift parameter, wherein the initial right shift parameter is an uniform offset parameter, and the offset parameter indicates a number of right shifting bits of the prediction value, wherein the offset parameter is set to be 6.

12. The decoder of claim 11, wherein the processor is configured to:
determine initial right shift parameters corresponding to MIP mode numbers as the uniform offset parameter.

13. The decoder of claim 12, wherein the processor is configured to:
when one of the initial right shift parameters is different from the offset parameter, modify the initial right shift parameter to the offset parameter, to enable the numbers of right shifting bits of all prediction values corresponding to all sizes and all MIP mode numbers to be the same.

14. The decoder of claim 12, wherein the processor is configured to: after determining the initial right shift parameters corresponding to MIP mode numbers as the uniform offset parameter,
modify an initial weight matrix and an initial bias matrix according to a preset calculation rule to obtain a modified weight matrix and a modified bias matrix, the initial weight matrix and the initial bias matrix corresponding to an initial right shift parameter subjected to unification modification; and
perform prediction on the current block according to the offset parameter, the modified weight matrix and the modified bias matrix.

* * * * *